US012640156B2

(12) United States Patent
Liu et al.

(10) Patent No.: US 12,640,156 B2
(45) Date of Patent: May 26, 2026

(54) AUDIO ENCODING METHOD AND APPARATUS, AND AUDIO DECODING METHOD AND APPARATUS

(71) Applicant: HUAWEI TECHNOLOGIES CO., LTD., Shenzhen (CN)

(72) Inventors: Shuai Liu, Beijing (CN); Yuan Gao, Beijing (CN); Bin Wang, Shenzhen (CN); Bingyin Xia, Beijing (CN); Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 189 days.

(21) Appl. No.: 18/504,102

(22) Filed: Nov. 7, 2023

(65) Prior Publication Data

US 2024/0079016 A1 Mar. 7, 2024

Related U.S. Application Data

(63) Continuation of application No. PCT/CN2022/092310, filed on May 11, 2022.

(30) Foreign Application Priority Data

May 14, 2021 (CN) ......................... 202110530309.1

(51) Int. Cl.
*G10L 19/008* (2013.01)
*G10L 25/03* (2013.01)

(52) U.S. Cl.
CPC ............ *G10L 19/008* (2013.01); *G10L 25/03* (2013.01)

(58) Field of Classification Search
CPC ..... G10L 19/008; G10L 25/03; G10L 19/022; G10L 19/20; G10L 19/06; G10L 19/173; G10L 19/002; G10L 19/035; G10L 19/04; G10L 19/18; G10L 19/22; G10L 19/24; G10L 19/02; G10L 19/08; G10L 19/09; G10L 2019/0005; G10L 25/90;
(Continued)

(56) References Cited

U.S. PATENT DOCUMENTS

2009/0299757 A1* 12/2009 Guo ...................... G10L 19/022 704/500
2015/0213805 A1* 7/2015 Peters ..................... G10L 19/08 704/500
(Continued)

FOREIGN PATENT DOCUMENTS

CN 105917408 A 8/2016

*Primary Examiner* — Leshui Zhang

(57) ABSTRACT

An audio encoding method and apparatus and an audio decoding method and apparatus are disclosed. During encoding of an audio channel signal of a current frame, whether a first target virtual loudspeaker and a second target virtual loudspeaker corresponding to an audio channel signal of a previous frame of the current frame meet a specified condition is first determined. When the first target virtual loudspeaker and the second target virtual loudspeaker meet the specified condition, a first encoding parameter of the audio channel signal of the current frame is determined based on a second encoding parameter of the audio channel signal of the previous frame, so that the audio channel signal of the current frame is encoded based on the first encoding parameter to obtain an encoding result, and the encoding result is written into a bitstream.

14 Claims, 8 Drawing Sheets

(58) Field of Classification Search
CPC . G10L 19/00; G10L 19/0017; G10L 19/0018; G10L 19/012; G10L 19/005; H04S 2420/11; H04S 3/00; H04S 2400/01; H04S 3/008; H04S 2420/03; H04S 2420/01; H04S 3/02; H04S 7/30; H04S 5/00; H04S 7/308; H04S 2400/03; H04S 2400/11; H04S 5/005; H04S 7/301; H04S 7/302; H04S 7/304
USPC .................................. 704/500–504; 381/1–23
See application file for complete search history.

(56) References Cited

U.S. PATENT DOCUMENTS

2017/0133021 A1* 5/2017 Krueger .................. G10L 19/24
2021/0375297 A1* 12/2021 Bruhn ................... G10L 19/008

* cited by examiner

AUDIO ENCODING METHOD AND APPARATUS, AND AUDIO DECODING METHOD AND APPARATUS

CROSS-REFERENCE TO RELATED APPLICATIONS

This application is a continuation of International Application No. PCT/CN2022/092310, filed on May 11, 2022, which claims priority to Chinese Patent Application No. 202110530309.1, filed on May 14, 2021. The disclosures of the aforementioned applications are hereby incorporated by reference in their entireties.

TECHNICAL FIELD

Embodiments of this application relate to the field of encoding and decoding technologies, and in particular, to an audio encoding method and apparatus and an audio decoding method and apparatus.

BACKGROUND

A three-dimensional audio technology is an audio technology for obtaining, processing, transmitting, rendering, and replaying sound events and three-dimensional sound field information in the real world. The three-dimensional audio technology enables sound to have a strong sense of space, envelopment, and immersion, and provides people with extraordinary "immersive" auditory experience. In a higher order ambisonics (HOA) technology, a recording stage, an encoding stage, and a replay stage are irrelevant to a speaker layout, and data in an HOA format has a rotatable replay feature. Therefore, the HOA technology has higher flexibility in three-dimensional audio replay, and has gained more extensive attention and research.

To achieve better auditory effect of audio, in the HOA technology, a large amount of data needs to be used to record more detailed information of a sound scene. Scene-based three-dimensional audio signal sampling and storage are more conducive to storage and transmission of spatial information of an audio signal. However, with an increase of an HOA order, a data amount also increases, and a large amount of data causes difficulty in transmission and storage. Therefore, an HOA signal needs to be encoded and decoded.

A virtual loudspeaker signal and a residual signal are generated by encoding a to-be-encoded HOA signal, and then the virtual loudspeaker signal and the residual signal are further encoded to obtain a bitstream. Usually, during encoding of the virtual loudspeaker signal and the residual signal, a virtual loudspeaker signal and a residual signal of each frame are encoded and decoded. However, only a correlation between signals of a current frame is considered during encoding of a virtual loudspeaker signal and a residual signal of each frame. This leads to high calculation complexity and low encoding efficiency.

SUMMARY

Embodiments of this application provide an audio encoding method and apparatus and an audio decoding method and apparatus, to resolve high calculation complexity.

According to a first aspect, an embodiment of this application provides an audio encoding method, including: obtaining an audio channel signal of a current frame, where the audio channel signal of the current frame is obtained by performing spatial mapping on a raw higher order ambisonics HOA signal by using a first target virtual loudspeaker; when it is determined that the first target virtual loudspeaker and a second target virtual loudspeaker meet a specified condition, determining a first encoding parameter of the audio channel signal of the current frame based on a second encoding parameter of an audio channel signal of a previous frame of the current frame, where the audio channel signal of the previous frame corresponds to the second target virtual loudspeaker; encoding the audio channel signal of the current frame based on the first encoding parameter; and writing an encoding result for the audio channel signal of the current frame into a bitstream. In the foregoing method, during encoding of the current frame, if a virtual loudspeaker matching the current frame is adjacent to a virtual loudspeaker matching the previous frame, an encoding parameter of the current frame may be determined based on an encoding parameter of the previous frame, so that the encoding parameter of the current frame does not need to be recalculated, and encoding efficiency can be improved.

In a possible design, the method further includes: writing the first encoding parameter into the bitstream. In the foregoing design, an encoding parameter determined based on the encoding parameter of the previous frame is written into the bitstream as the encoding parameter of the current frame, so that a peer end obtains the encoding parameter, and encoding efficiency is improved.

In a possible design, the first encoding parameter includes one or more of an inter-channel pairing parameter, an inter-channel auditory spatial parameter, or an inter-channel bit allocation parameter.

In a possible design, the inter-channel auditory spatial parameter includes one or more of an inter-channel level difference ILD, an inter-channel time difference ITD, or an inter-channel phase difference IPD.

In a possible design, the specified condition includes that a first spatial location overlaps a second spatial location; and the determining a first encoding parameter of the audio channel signal of the current frame based on a second encoding parameter of an audio channel signal of a previous frame includes: using the second encoding parameter of the audio channel signal of the previous frame as the first encoding parameter of the audio channel signal of the current frame. In the foregoing design, when a spatial location of a target virtual loudspeaker for the previous frame overlaps a spatial location of a target virtual loudspeaker for the current frame, the encoding parameter of the previous frame is reused as the encoding parameter of the current frame. An inter-frame spatial correlation between audio channel signals is considered, and the encoding parameter of the current frame does not need to be calculated again, so that encoding efficiency can be improved.

In a possible design, the method further includes: writing a reuse flag into the bitstream, where a value of the reuse flag is a first value, and the first value indicates that the second encoding parameter is reused as the first encoding parameter of the audio channel signal of the current frame. In the foregoing design, the manner of writing the reuse flag into the bitstream to notify a decoder side to determine the encoding parameter of the current frame is simple and effective.

In a possible design, the first spatial location includes first coordinates of the first target virtual loudspeaker, the second spatial location includes second coordinates of the second target virtual loudspeaker, and that the first spatial location overlaps the second spatial location includes that the first coordinates are the same as the second coordinates; or the first spatial location includes a first sequence number of the first target virtual loudspeaker, the second spatial location includes a second sequence number of the second target virtual loudspeaker, and that the first spatial location overlaps the second spatial location includes that the first sequence number is the same as the second sequence number; or the first spatial location includes a first HOA coefficient for the first target virtual loudspeaker, the second spatial location includes a second HOA coefficient for the second target virtual loudspeaker, and that the first spatial location overlaps the second spatial location includes that the first HOA coefficient is the same as the second HOA coefficient. In the foregoing design, a spatial location is represented by coordinates, a sequence number, or an HOA coefficient, and is used to determine whether a virtual loudspeaker for the previous frame overlaps a virtual loudspeaker for the current frame. This is simple and effective.

In a possible design, the first target virtual loudspeaker includes M virtual loudspeakers, and the second target virtual loudspeaker includes N virtual loudspeakers; the specified condition includes: the first spatial location of the first target virtual loudspeaker does not overlap the second spatial location of the second target virtual loudspeaker, and an $m^{th}$ virtual loudspeaker included in the first target virtual loudspeaker is located within a specified range centered on an $n^{th}$ virtual loudspeaker included in the second target virtual loudspeaker, where m includes positive integers less than or equal to M, and n includes positive integers less than or equal to N; and the determining a first encoding parameter of the audio channel signal of the current frame based on a second encoding parameter of an audio channel signal of a previous frame includes: adjusting the second encoding parameter based on a specified ratio to obtain the first encoding parameter. In the foregoing design, when a spatial location of a target virtual loudspeaker for the previous frame does not overlap, but is adjacent to, a spatial location of a target virtual loudspeaker for the current frame, the encoding parameter of the current frame is adjusted based on the encoding parameter of the previous frame. An inter-frame spatial correlation between audio channel signals is considered, and the encoding parameter of the current frame does not need to be calculated in a complex calculation method, so that encoding efficiency can be improved.

In this embodiment of the present disclosure, the first encoding parameter may be one or more encoding parameters; and the adjusting may be decreasing, increasing, partially decreasing and partially remaining unchanged, partially increasing and partially remaining unchanged, partially decreasing and partially increasing, or partially decreasing, partially remaining unchanged, and partially increasing.

In a possible design, when the first spatial location includes the first coordinates of the first target virtual loudspeaker, and the second spatial location includes the second coordinates of the second target virtual loudspeaker, whether the $m^{th}$ virtual loudspeaker is located within the specified range centered on the $n^{th}$ virtual loudspeaker is determined by relevance between the $m^{th}$ virtual loudspeaker and the $n^{th}$ virtual loudspeaker, where the relevance meets the following condition:

$$R = norm(M_H \cdot M_{FH}^T),$$

where

R indicates the relevance, norm( ) indicates a normalization operation, $M_H$ is a matrix formed by coordinates of virtual loudspeakers included in the first target virtual loudspeaker for the current frame, and $$M_{FH}^T$$

is a transpose of a matrix formed by coordinates of virtual loudspeakers included in the second target virtual loudspeaker for the previous frame; and when the relevance is greater than a specified value, the $m^{th}$ virtual loudspeaker is located within the specified range centered on the $n^{th}$ virtual loudspeaker. The foregoing design provides a simple and effective manner of determining a proximity relationship between the virtual loudspeaker for the previous frame and the virtual loudspeaker for the current frame.

In a possible design, the method further includes: writing a reuse flag into the bitstream, where a value of the reuse flag is a second value, and the second value indicates that the first encoding parameter of the audio channel signal of the current frame is obtained by adjusting the second encoding parameter based on the specified ratio.

In a possible design, the method further includes: writing the specified ratio into the bitstream. In the foregoing design, the specified ratio is indicated to the decoder side by using the bitstream, so that the decoder side determines the encoding parameter of the current frame based on the specified ratio. In this way, the decoder side obtains the encoding parameter, and encoding efficiency is improved.

According to a second aspect, an embodiment of this application provides an audio decoding method, including: parsing a reuse flag from a bitstream, where the reuse flag indicates that a first encoding parameter of an audio channel signal of a current frame is determined based on a second encoding parameter of an audio channel signal of a previous frame of the current frame; determining the first encoding parameter based on the second encoding parameter of the audio channel signal of the previous frame; and decoding the audio channel signal of the current frame from the bitstream based on the first encoding parameter. In the foregoing design, a decoder side does not need to parse an encoding parameter from the bitstream, so that decoding efficiency can be improved.

In a possible design, the determining the first encoding parameter based on the second encoding parameter of the audio channel signal of the previous frame includes: when a value of the reuse flag is a first value and the first value indicates that the second encoding parameter is reused as the first encoding parameter, obtaining the second encoding parameter as the first encoding parameter. In the foregoing design, no encoding parameter needs to be decoded from the bitstream, and only the reuse flag needs to be decoded, so that decoding efficiency can be improved.

In a possible design, the determining the first encoding parameter based on the second encoding parameter of the audio channel signal of the previous frame includes: when a value of the reuse flag is a second value and the second value indicates that the first encoding parameter is obtained by adjusting the second encoding parameter based on a specified ratio, adjusting the second encoding parameter based on the specified ratio to obtain the first encoding parameter.

In a possible design, the method further includes: when the value of the reuse flag is the second value, decoding the bitstream to obtain the specified ratio.

In a possible design, an encoding parameter of the audio channel signal includes one or more of an inter-channel pairing parameter, an inter-channel auditory spatial parameter, or an inter-channel bit allocation parameter.

According to a third aspect, an embodiment of this application provides an audio encoding apparatus. For beneficial effect, refer to related descriptions of the first aspect. Details are not described herein again. The audio encoding apparatus includes several functional units for implementing any method in the first aspect. For example, the audio encoding apparatus may include: a spatial encoding unit, configured to obtain an audio channel signal of a current frame, where the audio channel signal of the current frame is obtained by performing spatial mapping on a raw higher order ambisonics HOA signal by using a first target virtual loudspeaker; and a core encoding unit, configured to: when it is determined that the first target virtual loudspeaker and a second target virtual loudspeaker meet a specified condition, determine a first encoding parameter of the audio channel signal of the current frame based on a second encoding parameter of an audio channel signal of a previous frame of the current frame, where the audio channel signal of the previous frame corresponds to the second target virtual loudspeaker; encode the audio channel signal of the current frame based on the first encoding parameter; and write an encoding result for the audio channel signal of the current frame into a bitstream.

In a possible design, the core encoding unit is further configured to write the first encoding parameter into the bitstream.

In a possible design, the first encoding parameter includes one or more of an inter-channel pairing parameter, an inter-channel auditory spatial parameter, or an inter-channel bit allocation parameter.

In a possible design, the specified condition includes that a first spatial location of the first target virtual loudspeaker overlaps a second spatial location of the second target virtual loudspeaker, and the core encoding unit is specifically configured to use the second encoding parameter of the audio channel signal of the previous frame as the first encoding parameter of the audio channel signal of the current frame.

In a possible design, the core encoding unit is further configured to write a reuse flag into the bitstream, where a value of the reuse flag is a first value, and the first value indicates that the second encoding parameter is reused as the first encoding parameter of the audio channel signal of the current frame.

In a possible design, the first spatial location includes first coordinates of the first target virtual loudspeaker, the second spatial location includes second coordinates of the second target virtual loudspeaker, and that the first spatial location overlaps the second spatial location includes that the first coordinates are the same as the second coordinates; or the first spatial location includes a first sequence number of the first target virtual loudspeaker, the second spatial location includes a second sequence number of the second target virtual loudspeaker, and that the first spatial location overlaps the second spatial location includes that the first sequence number is the same as the second sequence number; or the first spatial location includes a first HOA coefficient for the first target virtual loudspeaker, the second spatial location includes a second HOA coefficient for the second target virtual loudspeaker, and that the first spatial location overlaps the second spatial location includes that the first HOA coefficient is the same as the second HOA coefficient.

In a possible design, the first target virtual loudspeaker includes M virtual loudspeakers, and the second target virtual loudspeaker includes N virtual loudspeakers; the specified condition includes: the first spatial location of the first target virtual loudspeaker does not overlap the second spatial location of the second target virtual loudspeaker, and an $m^{th}$ virtual loudspeaker included in the first target virtual loudspeaker is located within a specified range centered on an $n^{th}$ virtual loudspeaker included in the second target virtual loudspeaker, where m includes positive integers less than or equal to M, and n includes positive integers less than or equal to N; and the core encoding unit is specifically configured to adjust the second encoding parameter based on a specified ratio to obtain the first encoding parameter.

In a possible design, when the first spatial location includes the first coordinates of the first target virtual loudspeaker, and the second spatial location includes the second coordinates of the second target virtual loudspeaker, whether the $m^{th}$ virtual loudspeaker is located within the specified range centered on the $n^{th}$ virtual loudspeaker is determined by relevance between the $m^{th}$ virtual loudspeaker and the $n^{th}$ virtual loudspeaker, where the relevance meets the following condition:

$$R = norm(M_H \cdot M_{FH}^T),$$

where

R indicates the relevance, norm( ) indicates a normalization operation, $M_H$ is a matrix formed by coordinates of virtual loudspeakers included in the first target virtual loudspeaker for the current frame, and $$M_{FH}^T$$

is a transpose of a matrix formed by coordinates of virtual loudspeakers included in the second target virtual loudspeaker for the previous frame; and when the relevance is greater than a specified value, the $m^{th}$ virtual loudspeaker is located within the specified range centered on the $n^{th}$ virtual loudspeaker.

In a possible design, the core encoding unit is further configured to write a reuse flag into the bitstream, where a value of the reuse flag is a second value, and the second value indicates that the first encoding parameter of the audio channel signal of the current frame is obtained by adjusting the second encoding parameter based on the specified ratio.

In a possible design, the core encoding unit is further configured to write the specified ratio into the bitstream.

According to a fourth aspect, an embodiment of this application provides an audio decoding apparatus. For beneficial effect, refer to related descriptions of the second aspect. Details are not described herein again. The audio decoding apparatus includes several functional units for implementing any method in the third aspect. For example, the audio decoding apparatus may include: a core decoding unit, configured to: parse a reuse flag from a bitstream, where the reuse flag indicates that a first encoding parameter of an audio channel signal of a current frame is determined based on a second encoding parameter of an audio channel signal of a previous frame of the current frame; determine the first encoding parameter based on the second encoding parameter of the audio channel signal of the previous frame; and decode the audio channel signal of the current frame from the bitstream based on the first encoding parameter;

and a spatial decoding unit, configured to perform spatial decoding on the audio channel signal to obtain a higher order ambisonics HOA signal.

In a possible design, the core decoding unit is specifically configured to: when a value of the reuse flag is a first value and the first value indicates that the second encoding parameter is reused as the first encoding parameter, obtain the second encoding parameter as the first encoding parameter.

In a possible design, the core decoding unit is specifically configured to: when a value of the reuse flag is a second value and the second value indicates that the first encoding parameter is obtained by adjusting the second encoding parameter based on a specified ratio, adjust the second encoding parameter based on the specified ratio to obtain the first encoding parameter.

In a possible design, the core decoding unit is specifically configured to: when the value of the reuse flag is the second value, decode the bitstream to obtain the specified ratio.

In a possible design, an encoding parameter of the audio channel signal includes one or more of an inter-channel pairing parameter, an inter-channel auditory spatial parameter, or an inter-channel bit allocation parameter.

According to a fifth aspect, an embodiment of this application provides an audio encoder, where the audio encoder is configured to encode an HOA signal. For example, the audio encoder may implement the method according to the first aspect. The audio encoder may include the apparatus according to any design of the third aspect.

According to a sixth aspect, an embodiment of this application provides an audio decoder, where the audio decoder is configured to decode an HOA signal from a bitstream. For example, the audio decoder may implement the method according to any design of the second aspect. The audio decoder includes the apparatus according to any design of the fourth aspect.

According to a seventh aspect, an embodiment of this application provides an audio encoding device, including a nonvolatile memory and a processor that are coupled to each other, where the processor invokes program code stored in the memory to perform the method according to any one of the first aspect or the designs of the first aspect.

According to an eighth aspect, an embodiment of this application provides an audio decoding device, including a non-volatile memory and a processor that are coupled to each other, where the processor invokes program code stored in the memory to perform the method according to any one of the second aspect or the designs of the second aspect.

According to a ninth aspect, an embodiment of this application provides a computer-readable storage medium. The computer-readable storage medium stores program code. The program code includes instructions for performing some or all of steps of any method according to the first aspect or the second aspect.

According to a tenth aspect, an embodiment of this application provides a computer program product. When the computer program product runs on a computer, the computer is enabled to perform some or all of steps of any method according to the first aspect or the second aspect.

According to an eleventh aspect, an embodiment of this application provides a computer-readable storage medium, including a bitstream obtained by using any method according to the first aspect.

It should be understood that, for beneficial effect of the third aspect to the tenth aspect of this application, reference may be made to related descriptions of the first aspect and the second aspect. Details are not described again.

DESCRIPTION OF EMBODIMENTS

Figure 1A:
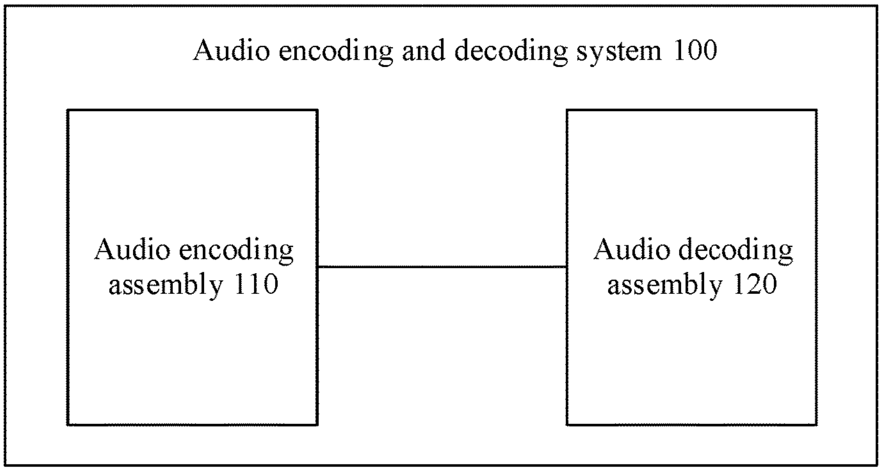
FIG. 1A is a schematic block diagram of an audio encoding and decoding system 100 according to an embodiment of this application.

The following describes embodiments of this application with reference to accompanying drawings in embodiments of this application. In the following descriptions, reference is made to the accompanying drawings that form a part of this disclosure and that show, by way of illustration, specific aspects of embodiments of this application or specific aspects in which embodiments of this application may be used. It should be understood that embodiments of this application may be used in other aspects, and may include structural or logical changes not depicted in the accompanying drawings. Therefore, the following detailed descriptions shall not be understood in a limiting sense, and the scope of this application is defined by the appended claims. For example, it should be understood that content disclosed with reference to a described method is also applicable to a corresponding device or system for performing the method, and content disclosed with reference to a described device or system is also applicable to a corresponding method performed by the device or system. For example, if one or more specific method steps are described, a corresponding device may include one or more units such as a functional unit to perform the described one or more method steps (for example, there is one unit for performing the one or more steps, or there are a plurality of units, where each unit performs one or more of a plurality of steps), even if the one or more units are not explicitly described or illustrated in the accompanying drawings. In addition, for example, if a specific apparatus is described based on one or more units such as a functional unit, a corresponding method may include one or more steps for implementing functionality of the one or more units (for example, there is one step for implementing the functionality of the one or more units, or there are a plurality of steps, where each step is used for implementing functionality of one or more of a plurality of units), even if the one or more of steps are not explicitly described or illustrated in the accompanying drawings. Further, it should be understood that features of various example embodiments and/or aspects described in this specification may be combined with each other, unless otherwise specified.

"First", "second", and similar terms mentioned in this specification do not indicate any order, quantity, or importance, but are merely intended to distinguish between different components. Similarly, "a", "an", or a similar term does not indicate a limitation on a quantity either, but indicates existence of at least one. "Connection", "connected", or a similar term is not limited to a physical or mechanical connection, but may include an electrical connection, regardless of a direct or indirect electrical connection.

"A plurality of" mentioned in this specification indicates two or more. "And/or" describes an association relationship between associated objects and indicates that three relationships may exist. For example, A and/or B may indicate the following three cases: Only A exists, both A and B exist, and only B exists. The character "/" usually indicates an "or" relationship between the associated objects.

The following describes a system architecture to which embodiments of this application are applied. FIG. 1A is a schematic block diagram of an example audio encoding and decoding system 100 to which embodiments of this application are applied. As shown in FIG. 1A, the audio encoding and decoding system 100 may include an audio encoding assembly 110 and an audio decoding assembly 120. The audio encoding assembly 110 is configured to perform audio encoding on an HOA signal (or a 3D audio signal). Optionally, the audio encoding assembly 110 may be implemented by using software, hardware, or a combination of software and hardware. This is not specifically limited in this embodiment of this application.

Figure 1B:
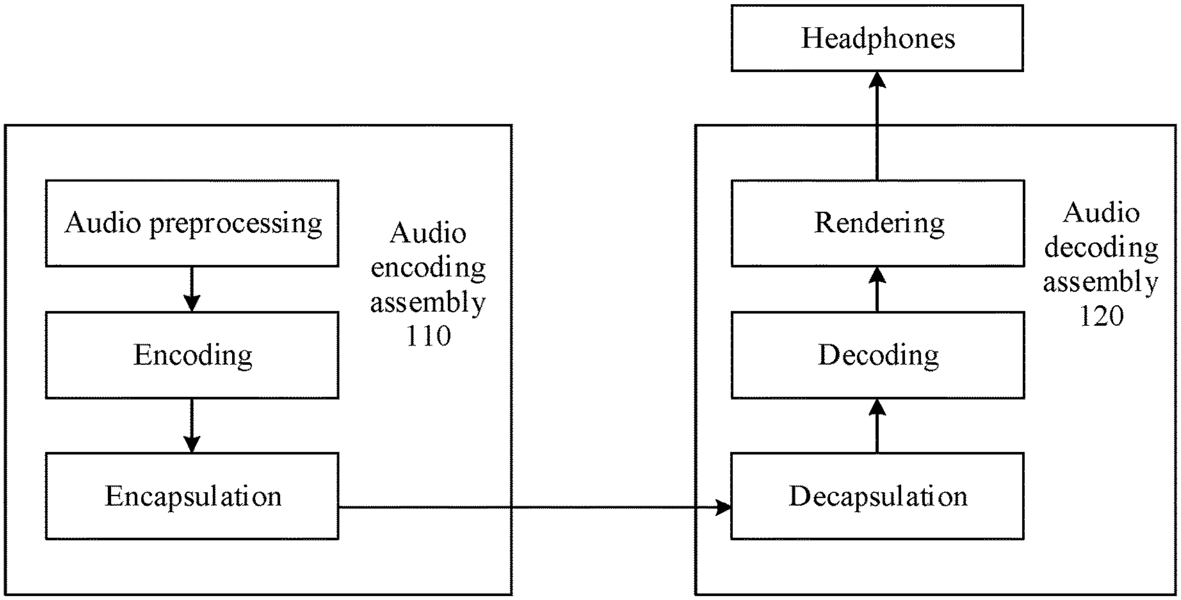
FIG. 1B is a schematic block diagram of an audio encoding and decoding process according to an embodiment of this application.

As shown in FIG. 1B, that the audio encoding assembly 110 encodes an HOA signal (or a 3D audio signal) may include the following several steps:

(1) Perform audio preprocessing (audio preprocessing) on an obtained HOA signal. The preprocessing may include filtering out a low-frequency part from the HOA signal, for example, extracting direction information from the HOA signal by using 20 Hz or 50 Hz as a demarcation point.

The HOA signal may be captured by an audio capture assembly and sent to the audio encoding assembly 110. Optionally, the audio capture assembly and the audio encoding assembly 110 may be disposed in a same device or in different devices.

(2) Encode (Audio encoding) and encapsulate (File/Segment encapsulation) a signal obtained through audio preprocessing to obtain a bitstream.

(3) The audio encoding assembly 110 sends (Delivery) the bitstream to the audio decoding assembly 120 on a decoder side through a transmission channel.

The audio decoding assembly 120 is configured to decode the bitstream generated by the audio encoding assembly 110 to obtain the HOA signal.

Optionally, the audio encoding assembly 110 and the audio decoding assembly 120 may be connected in a wired or wireless manner. The audio decoding assembly 120 obtains, through the connection, the bitstream generated by the audio encoding assembly 110; or the audio encoding assembly 110 stores the generated bitstream to a memory, and the audio decoding assembly 120 reads the bitstream from the memory. Optionally, the audio decoding assembly 120 may be implemented by using software, hardware, or a combination of software and hardware. This is not limited in this embodiment of this application.

That the audio decoding assembly 120 decodes the bitstream to obtain the HOA signal may include the following several steps:

(1) Decapsulate (File/Segment decapsulation) the bitstream.

(2) Perform audio decoding (Audio decoding) on a signal obtained through decapsulation to obtain a decoded signal.

(3) Render (Audio rendering) the decoded signal.

(4) Map a rendered signal to headphones (headphones) of a listener or a speaker. The headphones of the listener may be independent headphones, or may be headphones on a terminal device such as a glasses device.

Optionally, the audio encoding assembly 110 and the audio decoding assembly 120 may be disposed in a same device or in different devices. The device may be a mobile terminal with an audio signal processing function, for example, a mobile phone, a tablet computer, a laptop portable computer, a desktop computer, a Bluetooth speaker, a recording pen, or a wearable device, or may be a network element with an audio signal processing capability in a core network or a wireless network, for example, a media gateway, a transcoding device, or a media resource server, or may be an audio codec applied to a virtual reality (virtual reality, VR) streaming (streaming) service. This is not limited in this embodiment of this application.

Figure 1C:
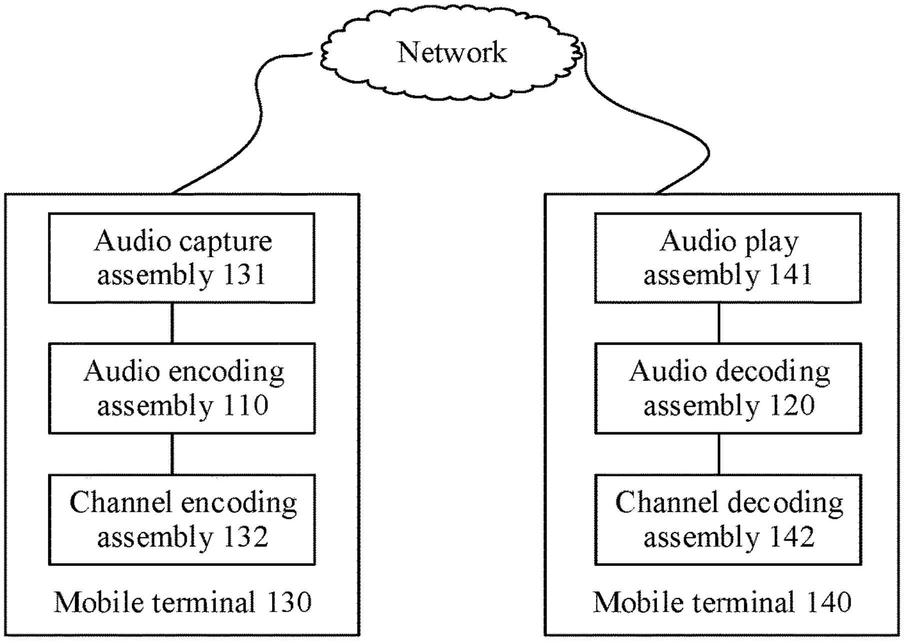
FIG. 1C is a schematic block diagram of another audio encoding and decoding system according to an embodiment of this application.

For example, as shown in FIG. 1C, in this embodiment, the audio encoding assembly 110 is disposed in a mobile terminal 130, the audio decoding assembly 120 is disposed in a mobile terminal 140, the mobile terminal 130 and the mobile terminal 140 are independent electronic devices with an audio signal processing capability, and the mobile terminal 130 and the mobile terminal 140 are connected to each other through a wireless or wired network.

Optionally, the mobile terminal 130 includes an audio capture assembly 131, the audio encoding assembly 110, and a channel encoding assembly 132. The audio capture assembly 131 is connected to the audio encoding assembly 110, and the audio encoding assembly 110 is connected to the channel encoding assembly 132.

Optionally, the mobile terminal 140 includes an audio play assembly 141, the audio decoding assembly 120, and a channel decoding assembly 142. The audio play assembly 141 is connected to the audio decoding assembly 120, and the audio decoding assembly 120 is connected to the channel encoding assembly 142. After capturing an HOA signal through the audio capture assembly 131, the mobile terminal 130 encodes the HOA signal through the audio encoding assembly 110 to obtain an encoded bitstream, and then encodes the encoded bitstream through the channel encoding assembly 132 to obtain a transmit signal.

The mobile terminal 130 sends the transmit signal to the mobile terminal 140 through a wireless or wired network, for example, may send the transmit signal to the mobile terminal 140 through a communication device in the wireless or wired network. The mobile terminal 130 and the mobile terminal 140 may correspond to a same communication device or different communication devices in the wired or wireless network.

After receiving the transmit signal, the mobile terminal 140 decodes the transmit signal through the channel decoding assembly 142 to obtain an encoded bitstream (which may be referred to as a bitstream for short), decodes the encoded bitstream through the audio decoding assembly 120 to obtain an HOA signal, and plays the HOA signal through the audio play assembly.

Figure 1D:
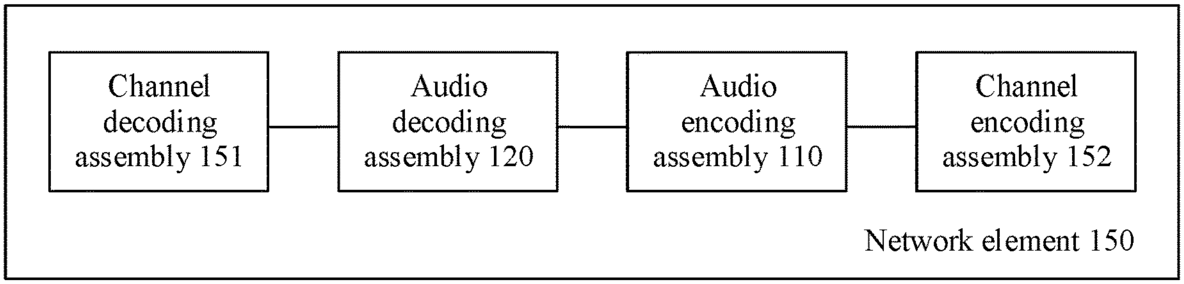
FIG. 1D is a schematic block diagram of a still another audio encoding and decoding system according to an embodiment of this application.

For example, as shown in FIG. 1D, in this embodiment of this application, an example in which the audio encoding assembly 110 and the audio decoding assembly 120 are disposed in a same network element 150 with an audio signal processing capability in a core network or a radio network is used for description.

Optionally, the network element 150 includes a channel decoding assembly 151, the audio decoding assembly 120, the audio encoding assembly 110, and a channel encoding assembly 152. The channel decoding assembly 151 is connected to the audio decoding assembly 120, the audio decoding assembly 120 is connected to the audio encoding assembly 110, and the audio encoding assembly 110 is connected to the channel encoding assembly 152.

After receiving a transmit signal sent by another device, the channel decoding assembly 151 decodes the transmit signal to obtain a first encoded bitstream, decodes the first encoded bitstream through the audio decoding assembly 120 to obtain an HOA signal, encodes the HOA signal through the audio encoding assembly 110 to obtain a second encoded bitstream, and encodes the second encoded bitstream through the channel encoding assembly 152 to obtain a transmit signal.

The another device may be a mobile terminal with an audio signal processing capability, or may be another network element with an audio signal processing capability. This is not limited in this embodiment.

Optionally, the audio encoding assembly 110 and the audio decoding assembly 120 in the network element may transcode an encoded bitstream sent by a mobile terminal.

Optionally, in this embodiment, a device on which the audio encoding assembly 110 is installed is referred to as an audio encoding device. During actual implementation, the audio encoding device may also have an audio decoding function. This is not limited in this embodiment of this application. A device on which the audio decoding assembly 120 is installed may be referred to as an audio decoding device.

Figure 2A:
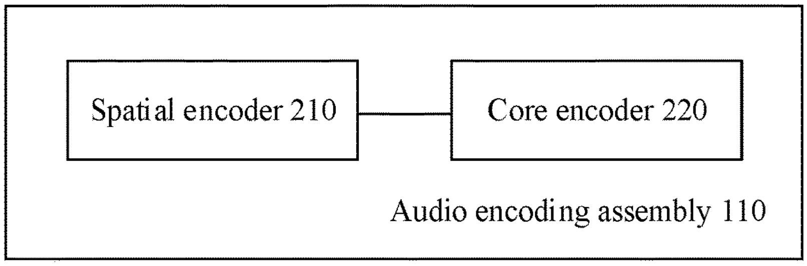
FIG. 2A is a schematic diagram of a structure of an audio encoding assembly according to an embodiment of this application.

For example, as shown in FIG. 2A, the audio encoding assembly 110 may include a spatial encoder 210 and a core encoder 220. A to-be-encoded HOA signal is encoded by the spatial encoder 210 to obtain an audio channel signal. To be specific, the to-be-encoded HOA signal is encoded by the spatial encoder 210 to generate a virtual loudspeaker signal and a residual signal. The core encoder 220 encodes the audio channel signal to obtain a bitstream.

Figure 2B:
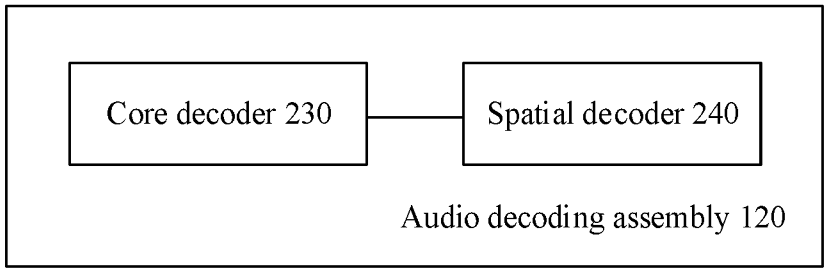
FIG. 2B is a schematic diagram of a structure of an audio decoding assembly according to an embodiment of this application.

For example, as shown in FIG. 2B, the audio decoding assembly 120 may include a core decoder 230 and a spatial decoder 240. After receiving a bitstream, the core decoder 230 decodes the bitstream to obtain an audio channel signal. Then the spatial decoder 240 may obtain a reconstructed HOA signal based on the audio channel signal (a virtual loudspeaker signal and a residual signal) obtained through decoding.

In an example, the spatial encoder 210 and the core encoder 220 may be two independent processing units, and the spatial decoder 240 and the core decoder 230 may be two independent processing units. The core encoder 220 usually encodes an audio channel signal as a plurality of single-channel signals, a stereo channel signal, or a multi-channel signal.

The core encoder 220 encodes an audio channel signal of each frame. In a possible manner, an encoding parameter of the audio channel signal of each frame is calculated. Then an audio channel signal of a current frame is encoded based on the calculated encoding parameter, an encoded signal is written into a bitstream, and the encoding parameter is written into the bitstream. However, in this manner, only a correlation between audio channel signals is considered, and an inter-frame spatial correlation between audio channel signals is ignored, leading to low encoding efficiency.

An audio channel signal is obtained by mapping a raw HOA signal by using a target virtual loudspeaker. Therefore, an inter-frame correlation between audio channel signals is related to selection of a virtual loudspeaker for an HOA signal. When spatial locations of virtual loudspeakers are the same or adjacent, audio channel signals have a strong inter-frame correlation. Based on this, considering an inter-frame correlation between audio channel signals, embodiments of this application provide an encoding and decoding scheme. Based on a proximity relationship between a virtual loudspeaker corresponding to a current frame and a virtual loudspeaker corresponding to a previous frame, if the virtual loudspeakers are adjacent or locations of the virtual loudspeakers overlap, an encoding parameter of the current frame may be determined based on an encoding parameter of the previous frame, so that the encoding parameter of the current frame is no longer calculated by using an algorithm for calculating encoding parameters, and encoding efficiency can be improved.

Before an encoding and decoding solution provided in embodiments of this application is described in detail, the following first briefly describes some concepts that may be used in embodiments of this application. Terms used in embodiments of this application are merely intended to describe specific embodiments of this application, but not to limit this application.

(1) An HOA signal is a three-dimensional (3D) representation of a sound field. The HOA signal is usually represented by a plurality of spherical harmonic coefficients (spherical harmonic coefficient, SHC) or other hierarchical elements. According to an HOA theory, an HOA signal corresponding to an ideal signal with a specific direction (for example, a far-field point source signal or planar wave signal) varies only in amplitudes in different channels, and therefore may be represented by a single-channel signal and a group of scale factors corresponding to channels. In an HOA technology, an HOA signal is usually converted into an actual loudspeaker signal for replay; or an HOA signal is converted into a virtual loudspeaker (virtual loudspeaker, VL) signal, and then the virtual loudspeaker signal is mapped to a loudspeaker signal corresponding to both ears for replay. Selection of a (virtual) loudspeaker is critical to quality of a reconstructed signal.

(2) A current frame is a sampling point that has a specific length and that is obtained by capturing an audio signal, for example, 960 points or 1024 points. A previous frame is a frame preceding the current frame. For example, if the current frame is an $n^{th}$ frame, the previous frame is an $(n-1)^{th}$ frame. The previous frame may also be referred to as a preceding frame.

(3) An audio channel signal may include a multi-channel virtual loudspeaker signal, or include a multi-channel virtual loudspeaker signal and residual signal. For example, a to-be-encoded HOA signal is mapped by using a plurality of virtual loudspeakers to obtain a multi-channel virtual loudspeaker signal and residual signal. Channel data of a virtual loudspeaker and a quantity of channels of a residual signal may be preset. The audio channel signal may also be referred to as a transmission channel, or may have another name. This is not specifically limited in this application. In an example, a virtual loudspeaker signal may be obtained in the following manner: A target virtual loudspeaker matching a to-be-encoded HOA signal of a current frame is selected from a virtual loudspeaker set based on a matching projection algorithm, and a virtual loudspeaker signal is obtained based on the HOA signal of the current frame and the selected target virtual loudspeaker. A residual signal may be obtained based on the to-be-encoded HOA signal and the virtual loudspeaker signal.

(4) Encoding parameter: For example, the encoding parameter may include one or more of an inter-channel pairing parameter, an inter-channel auditory spatial parameter, or an inter-channel bit allocation parameter.

The inter-channel pairing parameter represents a pairing relationship (or referred to as a grouping relationship) between channels to which a plurality of audio signals included in an audio channel signal respectively belong. Transmission channels of an inter-channel paired audio signal are paired according to a relevance criterion or the like. This is a calculation method for implementing efficient encoding for transmission channels.

In an example, the audio channel signal may include a virtual loudspeaker signal and a residual signal. The following describes an example of a manner of determining an inter-channel configuration parameter.

For example, the audio channel signal may be divided into two groups. Virtual loudspeaker signals constitute a group, which is referred to as a virtual loudspeaker signal group. Residual signals constitute a group, which is referred to as a residual signal group. The virtual loudspeaker signal group includes M single-channel virtual loudspeaker signals, where M is a positive integer greater than 2. The residual signal group includes N single-channel residual signals, where N is a positive integer greater than 2. For example, M=4, and N=4. An inter-channel pairing result may be pairing between two channels, pairing between three or more channels, or no pairing between channels. The pairing between two channels is used as an example. The inter-channel pairing parameter indicates a selection result for a pair formed by different signals in each group. The virtual loudspeaker signal group is used as an example. For example, the virtual loudspeaker signal group includes four channels: a channel 1, a channel 2, a channel 3, and a channel 4. For example, the inter-channel pairing parameter may be paring between the channel 1 and the channel 2, paring between the channel 3 and the channel 4, paring between the channel 1 and the channel 3, paring between the channel 2 and the channel 4, paring between the channel 1 and the channel 2, or no paring between the channel 3 and the channel 4. A manner of determining the inter-channel pairing parameter is not specifically limited in this application. In an example, the inter-channel pairing parameter may be determined by using a method for constructing an inter-channel correlation matrix W. For example, refer to a formula (1):

$$W = \begin{bmatrix} m11 & \dots & m14 \\ \vdots & \ddots & \vdots \\ m41 & \dots & m44 \end{bmatrix} \qquad \text{Formula (1)}$$

m11 to m44 each indicate a correlation between two channels. Further, it is assumed that values of diagonal elements of the matrix are 0, to obtain W'. Refer to a formula (2):

$$W' = \begin{bmatrix} 0 & \dots & m14 \\ \vdots & \ddots & \vdots \\ m41 & \dots & 0 \end{bmatrix} \qquad \text{Formula (2)}$$

A rule for inter-channel pairing may be obtaining a sequence number of an element with a largest value in W'. In this case, the inter-channel pairing parameter may be a sequence number of a matrix element.

The inter-channel auditory spatial parameter represents a degree of perception of a human ear for a characteristic of an acoustic image in auditory space. For example, the inter-channel auditory spatial parameter may include one or more of an inter-channel level difference (ILD) (which may also be referred to as a level difference between sound channels), an inter-channel time difference (ITD) (which may also be referred to as a time difference between sound channels), or an inter-channel phase difference (IPD) (which may also be referred to as a phase difference between sound channels).

The ILD parameter is used as an example. The ILD parameter may be a ratio of signal energy of each channel in the audio channel signal to an average value of energy of all channels. In an example, the ILD parameter may include two parameters: an absolute value of a ratio of each channel and an adjustment direction value. A manner of determining the ILD, the ITD, or the IPD is not specifically limited in embodiments of this application.

The ITD parameter is used as an example. For example, the audio channel signal includes signals in two channels: a channel 1 and a channel 2. In this case, the ITD parameter may be a time difference ratio between the two channels in the audio channel signal. The IPD parameter is used as an example. For example, the audio channel signal includes signals in two channels: a channel 1 and a channel 2. In this case, the IPD parameter may be a phase difference ratio between the two channels in the audio channel signal.

The inter-channel bit allocation parameter represents a bit allocation relationship, during encoding, between channels to which a plurality of audio signals included in the audio channel signal respectively belong. For example, inter-channel bit allocation may be implemented in a manner of energy-based inter-channel bit allocation. For example, channels to which bits are to be allocated include four channels: a channel 1, a channel 2, a channel 3, and a channel 4. The channels to which bits are to be allocated may be channels to which a plurality of audio signals included in the audio channel signal belong, or may be a plurality of channels obtained by performing channel pairing and down-mixing on the audio channel signal, or may be a plurality of channels obtained through inter-channel ILD calculation, inter-channel pairing, and down-mixing. Bit allocation ratios of the channel 1, the channel 2, the channel 3, and the channel 4 may be obtained through inter-channel bit allocation. The bit allocation ratios may be used as inter-channel bit allocation parameters. For example, the channel 1 occupies 3/16, the channel 2 occupies 5/16, the channel 3 occupies 6/16, and the channel 4 occupies 2/16. A manner of inter-channel bit allocation is not specifically limited in this embodiment of this application.

Figure 3A:
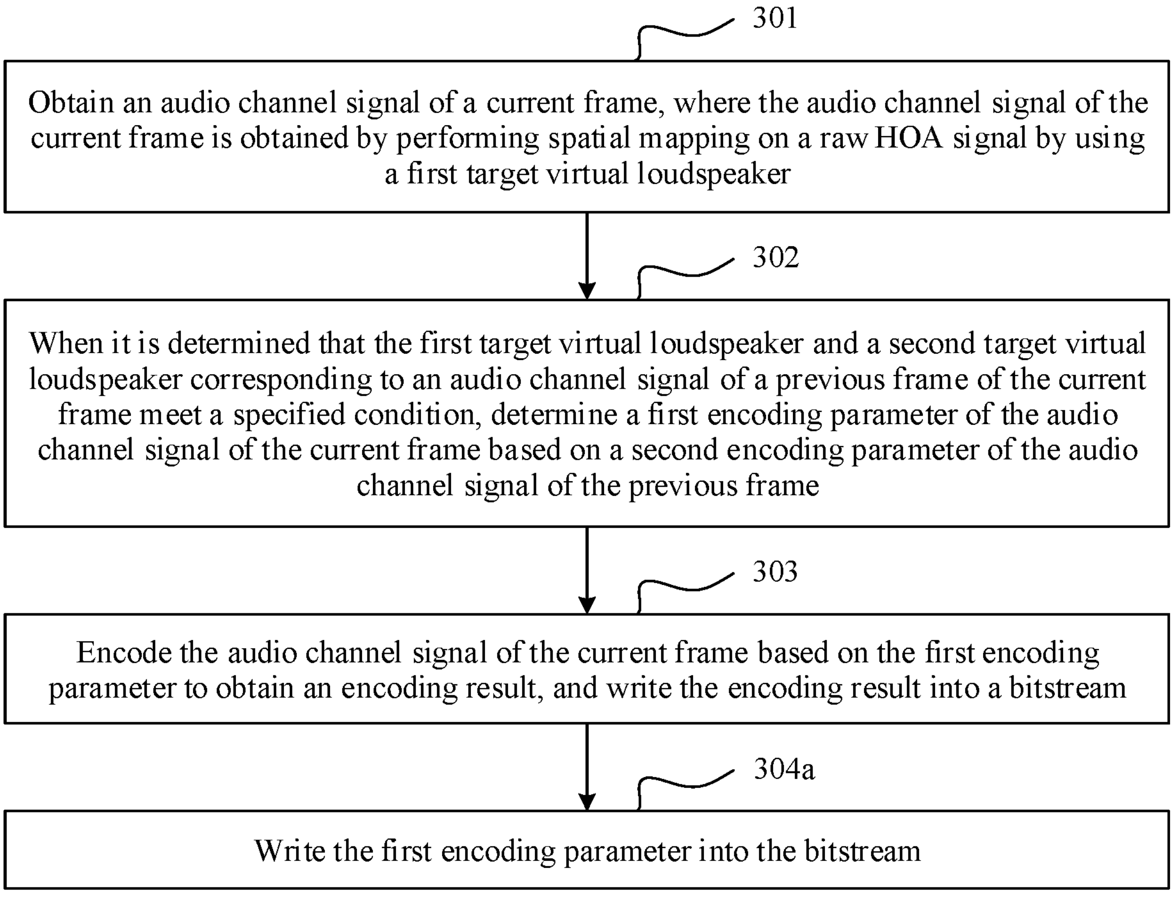
FIG. 3A is a schematic flowchart of an audio encoding method according to an embodiment of this application.
Figure 3B:
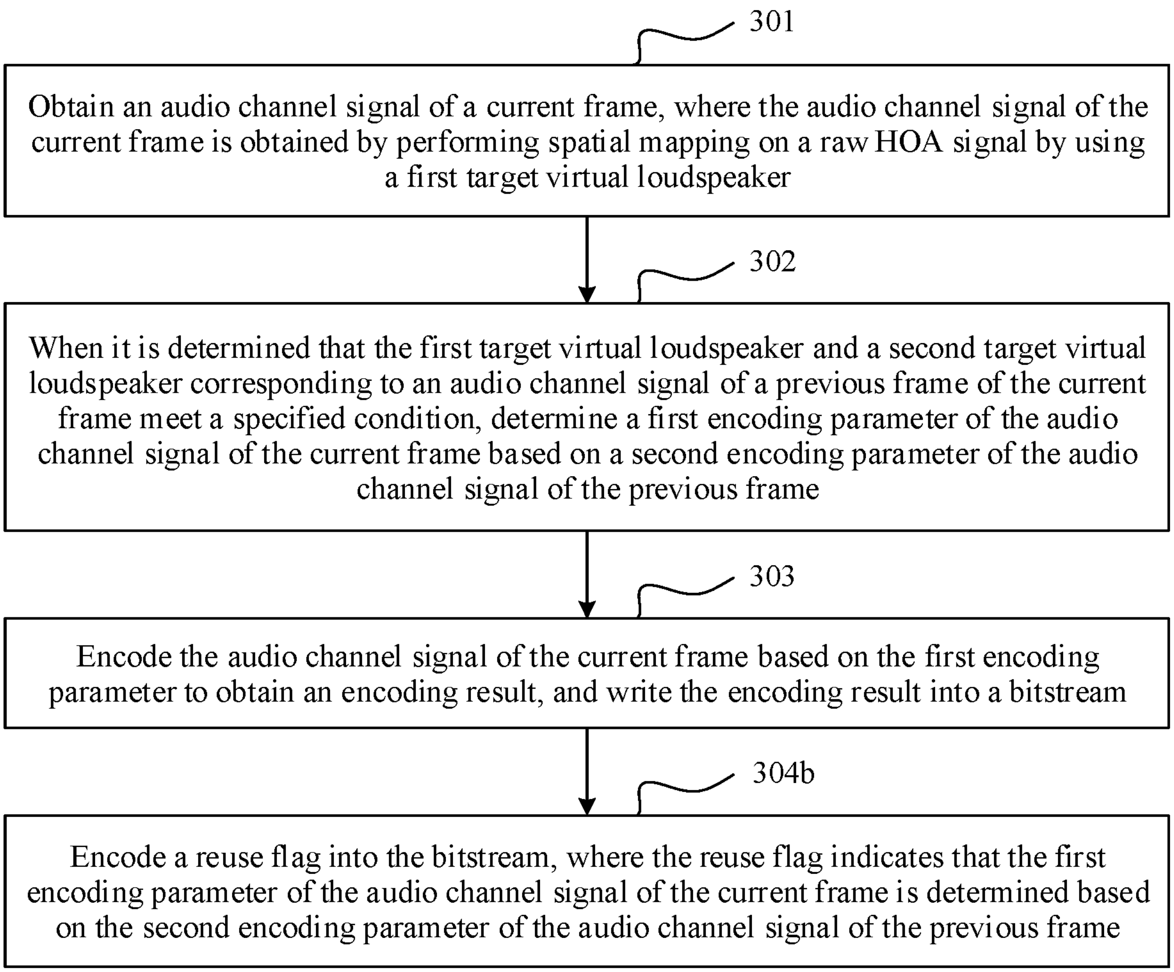
FIG. 3B is a schematic flowchart of another audio encoding method according to an embodiment of this application.

FIG. 3A and FIG. 3B are schematic flowcharts of an encoding method according to an example embodiment of this application. The encoding method may be implemented by an audio encoding device, an audio encoding assembly, or a core encoder. An example in which the encoding method is implemented by the audio encoding assembly is used for subsequent description.

301: Obtain an audio channel signal of a current frame, where the audio channel signal of the current frame is obtained by performing spatial mapping on a raw HOA signal by using a first target virtual loudspeaker.

In a possible example, the first target virtual loudspeaker may include one or more virtual loudspeakers, or may include one or more virtual loudspeaker groups. Each loudspeaker group may include one or more virtual loudspeakers. Different virtual loudspeaker groups may include a same quantity of virtual loudspeakers or different quantities of virtual loudspeakers. Each virtual loudspeaker of the first target virtual loudspeaker performs spatial mapping on the raw HOA signal to obtain an audio channel signal. The audio channel signal may include an audio signal of one or more channels. For example, one virtual loudspeaker performs spatial mapping on the raw HOA signal to obtain an audio channel signal of one channel.

For example, the first target virtual loudspeaker includes M virtual loudspeakers, where M is a positive integer. The audio channel signal of the current frame may include virtual loudspeaker signals of M channels. The virtual loudspeaker signals of the M channels are in a one-to-one correspondence with the M virtual loudspeakers.

A quantity of loudspeakers included in the first target virtual loudspeaker may be related to an encoding rate or a transmission rate, or may be related to complexity of the audio encoding assembly, or may be determined based on a configuration. For example, when the encoding rate is low, for example, is equal to 128 kbps, M=1; when the encoding rate is moderate, for example, is equal to 384 kbps, M=4; or when the encoding rate is high, for example, is equal to 768 kbps, M=7. For another example, when encoder complexity is low, M=1; when encoder complexity is moderate, M=2; or when encoder complexity is high, M=6. For still another example, when the encoding rate is 128 kbps and an encoding complexity requirement is low, M=1.

302: When it is determined that the first target virtual loudspeaker and a second target virtual loudspeaker corresponding to an audio channel signal of a previous frame of the current frame meet a specified condition, determine a first encoding parameter of the audio channel signal of the current frame based on a second encoding parameter of the audio channel signal of the previous frame.

For example, the first encoding parameter may include one or more of an inter-channel pairing parameter, an inter-channel auditory spatial parameter, or an inter-channel bit allocation parameter.

For example, the determining that the first target virtual loudspeaker and a second target virtual loudspeaker corresponding to an audio channel signal of a previous frame of the current frame meet a specified condition may be understood as determining that a proximity relationship between the first target virtual loudspeaker and the second target virtual loudspeaker corresponding to the audio channel signal of the previous frame of the current frame meets the specified condition, or may be understood as that the first target virtual loudspeaker is adjacent to the second target virtual loudspeaker corresponding to the audio channel signal of the previous frame of the current frame. The proximity relationship may be understood as a spatial location relationship between the first target virtual loudspeaker and the second target virtual loudspeaker, or the proximity relationship may be represented by a spatial correlation between the first target virtual loudspeaker and the second target virtual loudspeaker.

In an example, whether the specified condition is met may be determined by based on a spatial location of the first target virtual loudspeaker and a spatial location of the second target virtual loudspeaker. For ease of differentiation, the spatial location of the first target virtual loudspeaker is referred to as a first spatial location, and the spatial location of the second target virtual loudspeaker is referred to as a second spatial location. It can be understood that the first target virtual loudspeaker may include M virtual loudspeakers, and therefore the first spatial location may include a spatial location of each of the M virtual loudspeakers; and the second target virtual loudspeaker may include N virtual loudspeakers, and therefore the second spatial location may include a spatial location of each of the N virtual loudspeakers. Both M and N are integers greater than 1. M and N may be the same or different. For example, the spatial location of the target virtual loudspeaker may be represented by coordinates, a sequence number, or an HOA coefficient. Optionally, M=N.

In some possible embodiments, that the first target virtual loudspeaker and a second target virtual loudspeaker corresponding to an audio channel signal of a previous frame of the current frame meet a specified condition may include that the first spatial location overlaps the second spatial location, or may be understood as that a proximity relationship meets a specified condition. When the first spatial location overlaps the second spatial location, the second encoding parameter may be reused as the first encoding parameter. To be specific, an encoding parameter of the audio channel signal of the previous frame is used as an encoding parameter of the audio channel signal of the current frame.

When the first target virtual loudspeaker and the second target virtual loudspeaker each include a plurality of virtual loudspeakers, a quantity of virtual loudspeakers included in the first target virtual loudspeaker and a quantity of virtual loudspeakers included in the second target virtual loudspeaker are the same, and that the first spatial location overlaps the second spatial location may be described as that spatial locations of a plurality of virtual loudspeakers included in the first target virtual loudspeaker overlap, in a one-to-one correspondence, spatial locations of a plurality of virtual loudspeakers included in the second target virtual loudspeaker.

For example, when the spatial location is represented by coordinates, for ease of differentiation, coordinates of the first target virtual loudspeaker are referred to as first coordinates, and coordinates of the second target virtual loudspeaker are referred to as second coordinates. To be specific, the first spatial location includes the first coordinates of the first target virtual loudspeaker, and the second spatial location includes the second coordinates of the second target virtual loudspeaker. In this case, that the first spatial location overlaps the second spatial location means that the first coordinates are the same as the second coordinates. It should be understood that, when the first target virtual loudspeaker and the second target virtual loudspeaker each include a plurality of virtual loudspeakers, coordinates of a plurality of virtual loudspeakers included in the first target virtual loudspeaker are the same, in a one-to-one correspondence, as coordinates of a plurality of virtual loudspeakers included in the second target virtual loudspeaker.

For another example, when the spatial location is represented by a sequence number of a virtual loudspeaker, for ease of differentiation, a sequence number of the first target virtual loudspeaker is referred to as a first sequence number, and a sequence number of the second target virtual loudspeaker is referred to as a second sequence number. To be specific, the first spatial location includes the first sequence number of the first target virtual loudspeaker, and the second spatial location includes the second sequence number of the second target virtual loudspeaker. In this case, that the first spatial location overlaps the second spatial location means that the first sequence number is the same as the second sequence number. It should be understood that, when the first target virtual loudspeaker and the second target virtual loudspeaker each include a plurality of virtual loudspeakers, sequence numbers of a plurality of virtual loudspeakers included in the first target virtual loudspeaker are the same, in a one-to-one correspondence, as sequence numbers of a plurality of virtual loudspeakers included in the second target virtual loudspeaker.

For still another example, when the spatial location is represented by an HOA coefficient for a virtual loudspeaker, for ease of differentiation, an HOA coefficient for the first target virtual loudspeaker is referred to as a first HOA coefficient, and an HOA coefficient for the second target virtual loudspeaker is referred to as a second HOA coefficient. To be specific, the first spatial location includes the first HOA coefficient for the first target virtual loudspeaker, and the second spatial location includes the second HOA coefficient for the second target virtual loudspeaker. In this case, that the first spatial location overlaps the second spatial location means that the first HOA coefficient is the same as the second HOA coefficient. It should be understood that, when the first target virtual loudspeaker and the second target virtual loudspeaker each include a plurality of virtual loudspeakers, HOA coefficients of a plurality of virtual loudspeakers included in the first target virtual loudspeaker are the same, in a one-to-one correspondence, as HOA coefficients of a plurality of virtual loudspeakers included in the second target virtual loudspeaker.

In still some other possible embodiments, that the first target virtual loudspeaker and a second target virtual loudspeaker corresponding to an audio channel signal of a previous frame of the current frame meet a specified condition may include that the first spatial location does not overlap the second spatial location, and a plurality of virtual loudspeakers included in the first target virtual loudspeaker are located, in a one-to-one correspondence, within a specified range centered on a plurality of virtual loudspeakers included in the second target virtual loudspeaker; or may be understood as that a proximity relationship meets a specified condition. For example, whether an $m^{th}$ virtual loudspeaker included in the first target virtual loudspeaker is located within a specified range centered on an $n^{th}$ virtual loudspeaker included in the second target virtual loudspeaker may be determined, where m includes positive integers less than or equal to M, and n includes positive integers less than or equal to N, to determine whether the first target virtual loudspeaker and the second target virtual loudspeaker corresponding to the audio channel signal of the previous frame of the current frame meet the specified condition. For example, when the first spatial location does not overlap the second spatial location, if the plurality of virtual loudspeakers included in the first target virtual loudspeaker are located, in a one-to-one correspondence, within the specified range centered on the plurality of virtual loudspeakers included in the second target virtual loudspeaker, the second encoding parameter of the audio channel signal of the previous frame may be adjusted based on a specified ratio to obtain the first encoding parameter of the audio channel signal of the current frame. For another example, when the first spatial location does not overlap the second spatial location, if the plurality of virtual loudspeakers included in the first target virtual loudspeaker are located, in a one-to-one correspondence, within the specified range centered on the plurality of virtual loudspeakers included in the second target virtual loudspeaker, the second encoding parameter of the audio channel signal of the previous frame may be partially reused for the audio channel signal of the current frame. For example, an encoding parameter of a virtual loudspeaker signal in the audio channel signal of the previous frame is reused as an encoding parameter of a virtual loudspeaker signal in the audio channel signal of the current frame, and an encoding parameter of a virtual loudspeaker signal in the audio channel signal of the previous frame is not reused as an encoding parameter of a residual signal in the audio channel signal of the current frame. For another example, an encoding parameter of a virtual loudspeaker signal in the audio channel signal of the previous frame is reused as an encoding parameter of a virtual loudspeaker signal in the audio channel signal of the current frame, and an encoding parameter of a residual signal in the audio channel signal of the current frame is obtained by adjusting an encoding parameter of a virtual loudspeaker signal in the audio channel signal of the previous frame based on a specified ratio.

For example, the audio channel signal of the current frame includes two virtual loudspeaker signals: H1 and H2; and the first target virtual loudspeaker includes two virtual loudspeakers: a virtual loudspeaker 1-1 and a virtual loudspeaker 1-2. For example, the audio channel signal of the previous frame includes two virtual loudspeaker signals: FH1 and FH2; and the second target virtual loudspeaker includes two virtual loudspeakers: a virtual loudspeaker 2-1 and a virtual loudspeaker 2-2. The virtual loudspeaker 1-1 is located within a specified range centered on the virtual loudspeaker 2-1, and the virtual loudspeaker 1-2 is located within a specified range centered on the virtual loudspeaker 2-2. In this case, the proximity relationship between the first target virtual loudspeaker and the second target virtual loudspeaker meets the specified condition.

For example, the first spatial location includes first coordinates, the second spatial location includes second coordinates, and coordinates of a virtual loudspeaker are represented in a form of (an azimuth azi, an elevation ele). Coordinates of the virtual loudspeaker 1-1 are (H1_pos_aiz, H1_pos_ele), and coordinates of the virtual loudspeaker 1-2 are (H2_pos_aiz, H2_pos_ele). Coordinates of the virtual loudspeaker 2-1 are (FH1_pos_aiz, FH1_pos_ele), and coordinates of the virtual loudspeaker 2-2 are (FH2_pos_aiz, FH2_pos_ele). When H1_Pos_azi ∈ [HF1_Pos_azi±TH1], H1_Pos_ele ∈ [HF1_Pos_ele±TH2], H2_Pos_azi ∈ [HF2_Pos_azi±TH3], and H2_Pos_ele ∈ [HF1_Pos_ele±TH4], the proximity relationship between the first target virtual loudspeaker and the second target virtual loudspeaker meets the specified condition. To be specific, the plurality of virtual loudspeakers included in the first target virtual loudspeaker are located, in a one-to-one correspondence, within the specified range centered on the plurality of virtual loudspeakers included in the second target virtual loudspeaker. TH1, TH2, TH3, and TH4 are specified thresholds that represent specified ranges. For example, TH1, TH2, TH3, and TH4 may be the same or different; or TH1=TH3, and TH2=TH4.

For example, the first spatial location includes a first sequence number, and the second spatial location includes a second sequence number. A sequence number of the virtual loudspeaker 1-1 is H1_Ind, and a sequence number of the virtual loudspeaker 1-2 is H2_Ind. A sequence number of the virtual loudspeaker 2-1 is FH1_Ind, and a sequence number of the virtual loudspeaker 2-2 is FH2_Ind. When H1_Ind ∈ [FH1_Ind±TH5] and H2_Ind ∈ [FH2_Ind±TH6], the first target virtual loudspeaker and the second target virtual loudspeaker meet the specified condition. To be specific, the plurality of virtual loudspeakers included in the first target virtual loudspeaker are located, in a one-to-one correspondence, within the specified range centered on the plurality of virtual loudspeakers included in the second target virtual loudspeaker. TH5 and TH6 are specified thresholds that represent specified ranges. Optionally, TH5=TH6.

For example, the first spatial location includes a first HOA coefficient, and the second spatial location includes a second HOA coefficient. An HOA coefficient for the virtual loudspeaker 1-1 is H1_Coef, and an HOA coefficient of the virtual loudspeaker 1-2 is H2_Coef. An HOA coefficient for the virtual loudspeaker 2-1 is FH1_Coef, and an HOA coefficient for the virtual loudspeaker 2-2 is FH2_Coef. When H1_Coef ∈ [FH1_Coef±TH7] and H2_Ind ∈ [HF2_Ind±TH8], the first target virtual loudspeaker and the second target virtual loudspeaker meet the specified condition. To be specific, the plurality of virtual loudspeakers included in the first target virtual loudspeaker are located, in a one-to-one correspondence, within the specified range centered on the plurality of virtual loudspeakers included in the second target virtual loudspeaker. TH7 and TH8 are specified thresholds that represent specified ranges. Optionally, TH7=TH8.

In some possible embodiments, the audio encoding assembly may further determine relevance between the first target virtual loudspeaker and the second target virtual loudspeaker, to determine that the first target virtual loudspeaker and the second target virtual loudspeaker meet the specified condition.

In an example, the audio encoding assembly may determine the relevance between the first target virtual loudspeaker and the second target virtual loudspeaker based on the first coordinates of the first target virtual loudspeaker and the second coordinates of the second target virtual loudspeaker.

For example, when the audio encoding assembly determines that the first coordinates of the first target virtual loudspeaker are the same as the second coordinates of the second target virtual loudspeaker, the relevance R is equal to 1. In this case, the second encoding parameter may be reused as the first encoding parameter.

For another example, when the audio encoding assembly determines that the first coordinates of the first target virtual loudspeaker are not completely the same as the second coordinates of the second target virtual loudspeaker, the relevance may be determined by using the following formula (3):

$$R = 1 - norm\left(\frac{\sum_{0<m\leq N, 0<m\leq N} S(H^m, FH^n)}{N}\right) \quad \text{Formula (3)}$$

R indicates the relevance, norm( ) indicates a normalization operation, S( ) indicates an operation for determining a distance, $H^m$ indicates coordinates of an $m^{th}$ virtual loudspeaker of the first target virtual loudspeaker, and $FH^n$ indicates coordinates of an $n^{th}$ virtual loudspeaker of the second target virtual loudspeaker. $S(H^m, FH^n)$ indicates a distance between the $m^{th}$ virtual loudspeaker included in the first target virtual loudspeaker and the $n^{th}$ virtual loudspeaker included in the second target virtual loudspeaker. m includes positive integers not greater than N, and n includes positive integers not greater than N. N is a quantity of virtual loudspeaker included in the first target virtual loudspeaker and the second target virtual loudspeaker.

For another example, when the audio encoding assembly determines that the first coordinates of the first target virtual loudspeaker are not completely the same as the second coordinates of the second target virtual loudspeaker, the relevance may be determined by using the following formula (4):

The first target virtual loudspeaker for the current frame includes N virtual loudspeakers: H1, H2, . . . , and HN. The second target virtual loudspeaker for the previous frame includes N virtual loudspeakers: FH1, FH2, . . . , and FHN.

$$R = norm(M_H \cdot M_{FH}^T) \quad \text{Formula (4)}$$

$M_H$ is a matrix formed by coordinates of virtual loudspeakers included in the first target virtual loudspeaker for the current frame, and $M_{FH}^T$ is a transpose of a matrix formed by coordinates of virtual loudspeakers included in the second target virtual loudspeaker for the previous frame.

An example is as follows:

$M_H=[H1_{Pos_{azi}}, H1_{Pos_{ele}}, H2_{Pos_{azi}}, H2_{Pos_{ele}} \ldots HN_{Pos_{azi}}, HN_{Pos_{ele}}]$ $M_{FH}^T=[FH1_{Pos_{azi}}, FH1_{Pos_{ele}}, FH2_{Pos_{azi}}, FH2_{Pos_{ele}} \ldots FHN_{Pos_{azi}}, FHN_{Pos_{ele}}]^T.$ For another example, the relevance that is between the first target virtual loudspeaker and the second target virtual loudspeaker and that is determined based on the first coordinates of the first target virtual loudspeaker and the second coordinates of the second target virtual loudspeaker meets a condition shown in the following formula (5):

$$R = 1 - norm\left(\max_{0<i\leq N}\left(\sqrt{(H^i_{pos-azi} - FH^i_{pos-azi})^2 + (H^i_{pos-ele} - FH^i_{pos-ele})^2}\right)\right) \quad \text{Formula (5)}$$

R indicates the relevance, norm( ) indicates a normalization operation, max( ) indicates an operation for obtaining a maximum value of an element in the brackets, $$H^i_{pos\text{-}azi}$$

indicates an azimuth of an $i^{th}$ virtual loudspeaker included in the first target virtual loudspeaker, $$FH^i_{pos\text{-}azi}$$

indicates an azimuth of an $i^{th}$ virtual loudspeaker included in the second target virtual loudspeaker, $$H^{i}_{pos\text{-}ele}$$

indicates an elevation of the $i^{th}$ virtual loudspeaker included in the first target virtual loudspeaker, and $$FH^{i}_{pos\text{-}ele}$$

indicates an elevation of the $i^{th}$ virtual loudspeaker included in the second target virtual loudspeaker.

When the relevance is not equal to 1 and is greater than a specified value, the second encoding parameter may be partially reused as the first encoding parameter, or the first encoding parameter is obtained by adjusting the second encoding parameter based on a specified ratio. For example, the specified value is a number greater than 0.5 and less than 1.

303: Encode the audio channel signal of the current frame based on the first encoding parameter, and write an encoded signal into a bitstream. This may also be described as follows: The audio channel signal of the current frame is encoded based on the first encoding parameter to obtain an encoding result, and the encoding result is written into a bitstream.

In some possible embodiments, when the first spatial location of the first target virtual loudspeaker overlaps the second spatial location of the second target virtual loudspeaker, the second encoding parameter is reused as the first encoding parameter of encoding the audio channel signal of the current frame, and an encoded signal is written into a bitstream.

In some other possible embodiments, when the first spatial location does not overlap the second spatial location, if the plurality of virtual loudspeakers included in the first target virtual loudspeaker are located, in a one-to-one correspondence, within the specified range centered on the plurality of virtual loudspeakers included in the second target virtual loudspeaker, the first encoding parameter may be obtained by adjusting the second encoding parameter based on a specified ratio.

For example, the specified ratio is denoted as $\alpha$, and the first encoding parameter of the audio channel signal of the current frame is equal to $\alpha\times$the second encoding parameter of the audio channel signal of the previous frame, where a value range of $\alpha$ is (0, 1). The first encoding parameter may include one or more of an inter-channel pairing parameter, an inter-channel auditory spatial parameter, or an inter-channel bit allocation parameter. In some examples, a value of a may vary for different encoding parameters. For example, a value of $\alpha$ corresponding to the inter-channel pairing parameter is $\alpha 1$, and a value of $\alpha$ corresponding to the inter-channel bit allocation parameter is $\alpha 2$.

Further, the audio encoding assembly further needs to notify an audio decoding assembly of the first encoding parameter of the audio channel signal of the current frame by using the bitstream.

In some embodiments, the audio encoding assembly may write the first encoding parameter into the bitstream, to notify the audio decoding assembly of the first encoding parameter of the audio channel signal of the current frame. As shown in FIG. 3A, the audio encoding assembly further performs 304*a* to write the first encoding parameter into the bitstream.

Figure 4A:
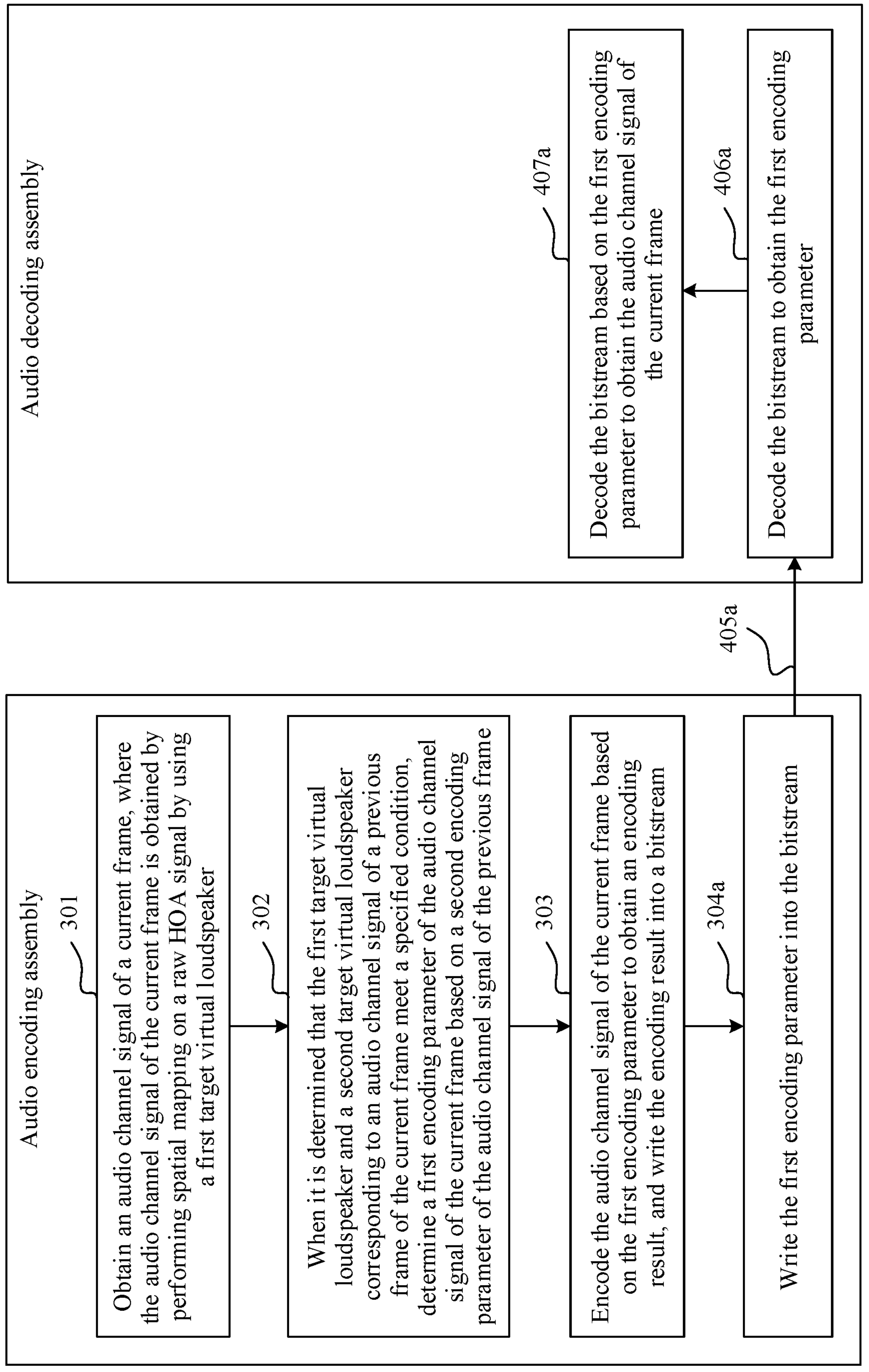
FIG. 4A is a schematic flowchart of an audio encoding and decoding method according to an embodiment of this application.

With reference to the encoding method in FIG. 3A, as shown in FIG. 4A, a decoder side may perform decoding by using the following decoding method. The method on the decoder side may be performed by an audio decoding device, an audio decoding assembly, or a core decoder. An example in which the audio decoding assembly performs the method on the decoder side is used below.

405*a*: The audio encoding assembly sends the bitstream to the audio decoding assembly, so that the audio decoding assembly receives the bitstream.

406*a*: The audio decoding assembly decodes the bitstream to obtain the first encoding parameter.

407*a*: The audio decoding assembly decodes the bitstream based on the first encoding parameter to obtain the audio channel signal of the current frame.

In some other embodiments, the audio encoding assembly may write a reuse flag into the bitstream, and indicate, by using different values of the reuse flag, how to obtain the first encoding parameter of the audio channel signal of the current frame. As shown in FIG. 3B, the audio encoding assembly further performs 304*b* to encode the reuse flag into the bitstream. The reuse flag indicates that the first encoding parameter of the audio channel signal of the current frame is determined based on the second encoding parameter of the audio channel signal of the previous frame.

In a possible manner, when the first spatial location of the first target virtual loudspeaker overlaps the second spatial location of the second target virtual loudspeaker, the reuse flag is a first value, to indicate that the second encoding parameter is reused as the first encoding parameter of the audio channel signal of the current frame. Optionally, in this manner, the first encoding parameter may not be written into the bitstream, to reduce resource usage and improve transmission efficiency. Optionally, when the first spatial location of the first target virtual loudspeaker does not overlap the second spatial location of the second target virtual loudspeaker, the reuse flag is a third value, to indicate that the second encoding parameter is not reused as the first encoding parameter of the audio channel signal of the current frame, and a determined first encoding parameter may be written into the bitstream. The first encoding parameter may be determined based on the second encoding parameter, or may be calculated. For example, when the first spatial location does not overlap the second spatial location, if the plurality of virtual loudspeakers included in the first target virtual loudspeaker are located, in a one-to-one correspondence, within the specified range centered on the plurality of virtual loudspeakers included in the second target virtual loudspeaker, the second encoding parameter may be adjusted based on the specified ratio to obtain the first encoding parameter, and then the obtained first encoding parameter is written into the bitstream, and the reuse flag whose value is the third value is written into the bitstream. For another example, when the first target virtual loudspeaker and the second target virtual loudspeaker do not meet the specified condition, the first encoding parameter of the audio channel signal of the current frame may be calculated, the first encoding parameter is written into the bitstream, and the reuse flag whose value is the third value is written into the bitstream. For example, the first value is 0, and the third value is 1; or the first value is 1, and the third value is 0. Certainly, the first value and the third value may alternatively be other values. This is not limited in this embodiment of this application.

In another possible manner, when the first spatial location of the first target virtual loudspeaker overlaps the second spatial location of the second target virtual loudspeaker, a reuse flag is written into the bitstream, where the reuse flag is a first value, to indicate that the second encoding parameter is reused as the first encoding parameter of the audio channel signal of the current frame; or the second encoding parameter is adjusted based on the specified ratio to obtain the first encoding parameter, and a reuse flag is written into the bitstream, where a value of the reuse flag is a second value, to indicate that the first encoding parameter of the audio channel signal of the current frame is obtained by adjusting the second encoding parameter based on the specified ratio. Optionally, the audio encoding assembly may further write the specified ratio into the bitstream. In some examples, when the first target virtual loudspeaker and the second target virtual loudspeaker do not meet the specified condition, the first encoding parameter of the audio channel signal of the current frame may be calculated, the first encoding parameter is written into the bitstream, and a reuse flag whose value is a third value is written into the bitstream. For example, the first value is 11, the second value is 01, and the third value is 00. Certainly, the first value, the second value, and the third value may alternatively be other values. This is not limited in this embodiment of this application.

Figure 4B:
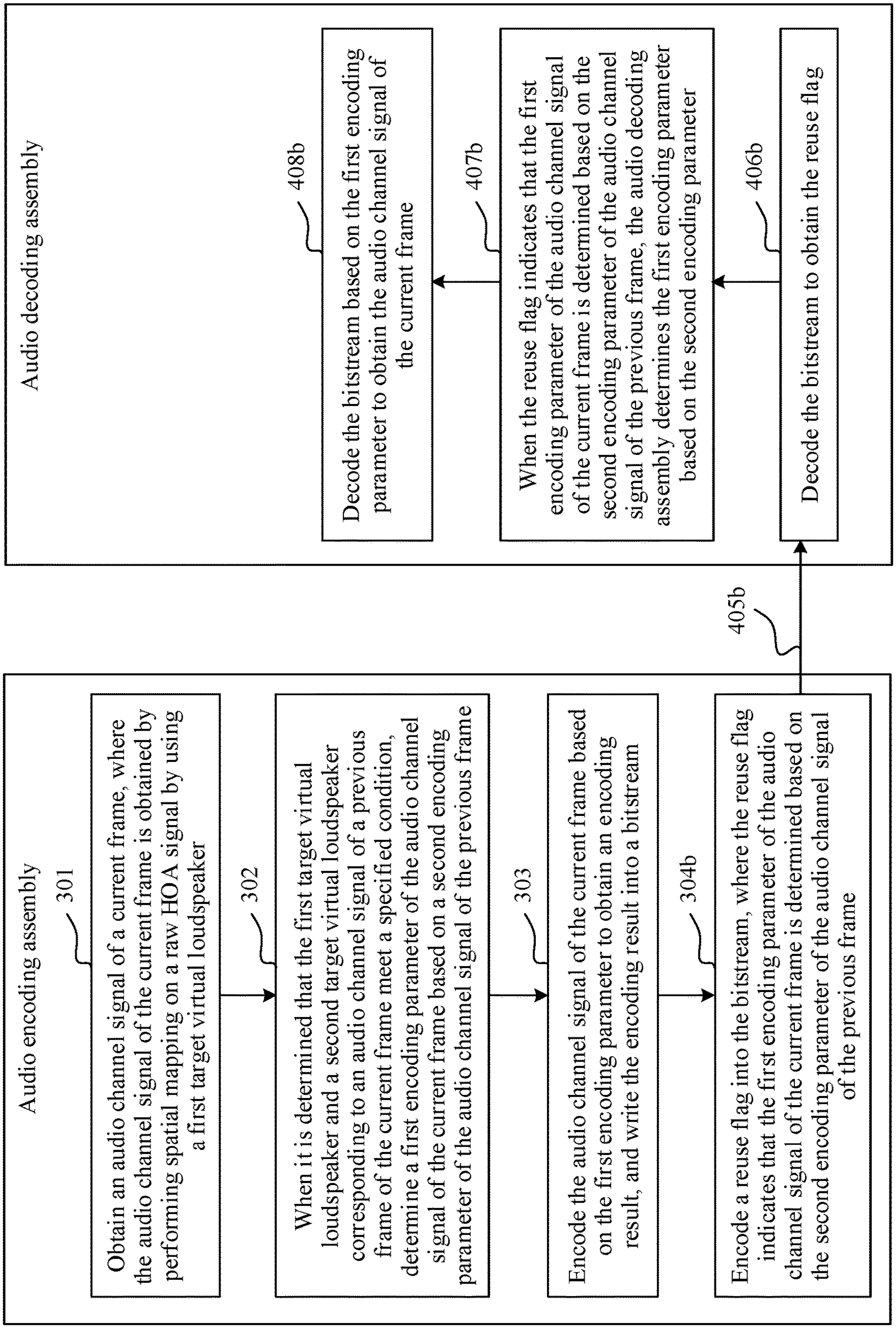
FIG. 4B is a schematic flowchart of another audio encoding and decoding method according to an embodiment of this application.

With reference to the encoding method corresponding to FIG. 3B, as shown in FIG. 4B, a decoder side may perform decoding by using the following decoding method. The method on the decoder side may be performed by an audio decoding device, an audio decoding assembly, or a core decoder. An example in which the audio decoding assembly performs the method on the decoder side is used below.

405*b*: The audio encoding assembly sends the bitstream to the audio decoding assembly, so that the audio decoding assembly receives the bitstream.

406*b*: The audio decoding assembly decodes the bitstream to obtain the reuse flag.

407*b*: When the reuse flag indicates that the first encoding parameter of the audio channel signal of the current frame is determined based on the second encoding parameter of the audio channel signal of the previous frame, the audio decoding assembly determines the first encoding parameter based on the second encoding parameter.

408*b*: Decode the bitstream based on the first encoding parameter to obtain the audio channel signal of the current frame.

In some scenarios, the reuse flag may include two values. For example, a value of the reuse flag is a first value, to indicate that the second encoding parameter is reused as the first encoding parameter of the audio channel signal of the current frame; or a value of the reuse flag is a third value, to indicate that the second encoding parameter is not reused as the first encoding parameter of the audio channel of the current frame. The audio decoding assembly decodes the bitstream to obtain the reuse flag; and when the value of the reuse flag is the first value, reuses the second encoding parameter as the first encoding parameter, and decodes the bitstream based on the reused second encoding parameter to obtain the audio channel signal of the current frame; or when the value of the reuse flag is the third value, decodes the bitstream to obtain the first encoding parameter of the audio channel signal of the current frame, and then decodes the bitstream based on the first encoding parameter obtained through decoding to obtain the audio channel signal of the current frame.

In some other scenarios, the reuse flag may include more than two values. The reuse flag is a first value, to indicate that the second encoding parameter is reused as the first encoding parameter of the audio channel signal of the current frame; or a value of the reuse flag is a second value, to indicate to adjust the second encoding parameter based on the specified ratio to obtain the first encoding parameter; or a value of the reuse flag is a third value, to indicate to decode the bitstream to obtain the first encoding parameter. The audio decoding assembly decodes the bitstream to obtain the reuse flag; and when the value of the reuse flag is the first value, reuses the second encoding parameter as the first encoding parameter, and decodes the bitstream based on the reused second encoding parameter to obtain the audio channel signal of the current frame; or when the value of the reuse flag is the second value, adjusts the second encoding parameter based on the specified ratio to obtain the first encoding parameter, and then decodes the bitstream based on the obtained first encoding parameter to obtain the audio channel signal of the current frame. Optionally, the specified ratio may be preconfigured on the audio decoding assembly, and the audio decoding assembly may obtain the configured specified ratio, to adjust the second encoding parameter based on the specified ratio to obtain the first encoding parameter. The specified ratio may be written by the audio encoding assembly into the bitstream, and the audio decoding assembly may obtain decode the bitstream to obtain the specified ratio. When the value of the reuse flag is the third value, the audio decoding assembly decodes the bitstream to obtain the first encoding parameter of the audio channel signal of the current frame, and then decodes the bitstream based on the first encoding parameter obtained through decoding to obtain the audio channel signal of the current frame.

In some possible embodiments, the first encoding parameter includes one or more of an inter-channel pairing parameter, an inter-channel auditory spatial parameter, or an inter-channel bit allocation parameter.

When the first encoding parameter includes a plurality of parameters, one reuse flag may be used for different parameters, or different reuse flags may be used for the plurality of parameters.

For example, a same reuse flag may be used for different parameters. When the reuse flag is the first value, it indicates that the second encoding parameter of the audio channel signal of the previous frame are reused as all parameters included in the first encoding parameter.

The following describes a case in which different reuse flags may be used for different parameters.

In an example, the first encoding parameter includes the inter-channel pairing parameter. For example, a reuse flag Flag_1 indicates whether an inter-channel pairing parameter of the audio channel signal of the previous frame is reused as an inter-channel pairing parameter of the audio channel signal of the current frame. For example, when Flag_1=1, it indicates that the inter-channel pairing parameter of the audio channel signal of the previous frame is reused as the inter-channel pairing parameter of the audio channel signal of the current frame; or when Flag_1=0, it indicates that the inter-channel pairing parameter of the audio channel signal of the previous frame is not reused as the inter-channel pairing parameter of the audio channel signal of the current frame. For another example, when Flag_1=11, it indicates that the inter-channel pairing parameter of the audio channel signal of the previous frame is reused as the inter-channel pairing parameter of the audio channel signal of the current frame; when Flag_1=00, it indicates that the inter-channel pairing parameter of the audio channel signal of the previous frame is not reused as the inter-channel pairing parameter of the audio channel signal of the current frame; or when Flag_1=01 (or 10), it indicates that the inter-channel pairing parameter of the audio channel signal of the current frame is obtained by adjusting the inter-channel pairing parameter of the audio channel signal of the previous frame based on a specified ratio, or it indicates that the inter-channel pairing parameter of the audio channel signal of the previous frame is partially reused as the inter-channel pairing parameter of the audio channel signal of the current frame.

In another example, the first encoding parameter includes the inter-channel auditory spatial parameter. The inter-channel auditory spatial parameter includes one or more of an ILD, an IPD, or an ITD.

In a possible manner, when the inter-channel auditory spatial parameter includes a plurality of parameters, one reuse flag may indicate whether an inter-channel auditory spatial parameter of the audio channel signal of the previous frame is reused as a plurality of parameters included in an inter-channel auditory spatial parameter of the audio channel signal of the current frame.

For example, the inter-channel auditory spatial parameter includes the ILD, the IPD, and the ITD. A reuse flag Flag_2 indicates whether the inter-channel auditory spatial parameter of the audio channel signal of the previous frame is reused as the inter-channel auditory spatial parameter (including an ILD, an IPD, and an ITD) for the audio channel signal of the current frame. For example, when Flag_2=1, it indicates that the inter-channel auditory spatial parameter of the audio channel signal of the previous frame is reused as the inter-channel auditory spatial parameter of the audio channel signal of the current frame; or when Flag_2=0, it indicates that the inter-channel auditory spatial parameter of the audio channel signal of the previous frame is not reused as the inter-channel auditory spatial parameter of the audio channel signal of the current frame. For another example, when Flag_2=11, it indicates that the inter-channel auditory spatial parameter of the audio channel signal of the previous frame is reused as the inter-channel auditory spatial parameter of the audio channel signal of the current frame; when Flag_2=00, it indicates that the inter-channel auditory spatial parameter of the audio channel signal of the previous frame is not reused as the inter-channel auditory spatial parameter of the audio channel signal of the current frame; or when Flag_2=01 (or 10), it indicates that the inter-channel auditory spatial parameter of the audio channel signal of the current frame is obtained by adjusting the inter-channel auditory spatial parameter of the audio channel signal of the previous frame based on a specified ratio, or it indicates that the inter-channel auditory spatial parameter of the audio channel signal of the previous frame is partially reused as the inter-channel auditory spatial parameter of the audio channel signal of the current frame.

In another possible manner, when the inter-channel auditory spatial parameter includes a plurality of parameters, different reuse flags are used for different parameters. For example, the inter-channel auditory spatial parameter includes the ILD, the IPD, and the ITD. A reuse flag Flag_2-1 indicates whether an ILD of the audio channel signal of the previous frame is reused as an ILD of the audio channel signal of the current frame; a reuse flag Flag_2-2 indicates whether an ITD of the audio channel signal of the previous frame is reused as an ITD of the audio channel signal of the current frame; and a reuse flag Flag_2-3 indicates whether an IPD of the audio channel signal of the previous frame is reused as an IPD of the audio channel signal of the current frame.

In still another example, the first encoding parameter includes the inter-channel bit allocation parameter. For example, a reuse flag Flag_3 indicates whether an inter-channel bit allocation parameter of the audio channel signal of the previous frame is reused as an inter-channel bit allocation parameter of the audio channel signal of the current frame. For example, when Flag_3=1, it indicates that the inter-channel bit allocation parameter of the audio channel signal of the previous frame is reused as the inter-channel bit allocation parameter of the audio channel signal of the current frame; or when Flag_3=0, it indicates that the inter-channel bit allocation parameter of the audio channel signal of the previous frame is not reused as the inter-channel bit allocation parameter of the audio channel signal of the current frame. For another example, when Flag 3=11, it indicates that the inter-channel bit allocation parameter of the audio channel signal of the previous frame is reused as the inter-channel bit allocation parameter of the audio channel signal of the current frame; when Flag 3=00, it indicates that the inter-channel bit allocation parameter of the audio channel signal of the previous frame is not reused as the inter-channel bit 5 allocation parameter of the audio channel signal of the current frame; or when Flag 3=01 (or 10), it indicates that the inter-channel bit allocation parameter of the audio channel signal of the current frame is obtained by adjusting the inter-channel bit allocation parameter of the audio channel signal of the previous frame based on a specified ratio, or it indicates that the inter-channel bit allocation parameter of the audio channel signal of the previous frame is partially reused as the inter-channel bit allocation parameter of the audio channel signal of the current frame.

The following describes an example of a process of generating an HOA coefficient for a virtual loudspeaker in embodiments of this application. An HOA coefficient for a virtual loudspeaker may alternatively be generated in another manner. This is not specifically limited in embodiments of this application.

For example, a sound wave is transmitted in an ideal medium, a wave velocity is k=w/c, and an angular frequency is w=2πf, where f is a frequency of the sound wave, and c is a sound velocity. In this case, sound pressure p meets the following formula (6), where $\nabla^2$ is a Laplace operator:

$$\nabla^2 p + k^2 p = 0 \quad \text{Formula (6)}$$

p in an equation shown in the formula (6) is solved in spherical coordinates. In a passive spherical region, the solution p of the equation may be expressed as the following formula (7):

$$p(r, \theta, \varphi, k) = s\sum_{m=0}^{\infty}(2m+1)j^m j_m^{kr}(kr)\sum_{0\le n\le m, \sigma=\pm 1} Y_{m,n}^{\sigma}(\theta_s, \varphi_s) Y_{m,n}^{\alpha}(\theta, \varphi) \quad \text{Formula (7)}$$

In the formula (7), r indicates a radius of a sphere, θ indicates an azimuth, φ indicates an elevation, k indicates a wave velocity, s is an amplitude of an ideal planar wave, m is a sequence number of an HOA order, $$j^m j_m^{kr}(kr)$$

is a spherical Bessel function, also referred to as a radial basis function, and the 1st j in $$j^m j_m^{kr}(kr)$$

indicates an imaginary unit. The $$(2m+1)j^m j_m^{kr}(kr)$$

part does not change with an angle.

$$Y_{m,n}^{\sigma}(\theta, \varphi)$$

is a spherical harmonic function in θ and φ directions, and $$Y_{m,n}^{\sigma}(\theta_s, \varphi_s)$$

is a spherical harmonic function in a sound source direction.

An ambisonics coefficient may be expressed as a formula (8):

$$B_{m,n}^{\sigma} = s \cdot Y_{m,n}^{\sigma}(\theta_s, \varphi_s) \quad \text{Formula (8)}$$

An expansion form corresponding to the formula (7) is further obtained based on the formula (8), as shown in a formula (9):

$$p(r, \theta, \varphi, k) = \sum_{m=0}^{\infty} j^m j_m^{kr}(kr) \sum_{0 \le n \le m, \sigma=\pm 1} B_{m,n}^{\sigma} Y_{m,n}^{\sigma}(\theta, \varphi) \quad \text{Formula (9)}$$

The formula (9) indicates that a sound field may be expanded on a spherical surface based on a spherical harmonic function, and the sound field is represented by the coefficient $$B_{m,n}^{\sigma}.$$

Alternatively, the coefficient $$B_{m,n}^{\sigma}$$

is known, and a sound field may be reconstructed based on $$B_{m,n}^{\sigma}.$$

The foregoing formula is truncated to an $N^{th}$ item, and the coefficient $$B_{m,n}^{\sigma}$$

is used as an approximate description of the sound field, and therefore is referred to as an $N^{th}$-order HOA coefficient. The HOA coefficient may also be referred to as an ambisonics coefficient. A $P^{th}$-order ambisonics coefficient has a total of $(P+1)^2$ channels. An ambisonics signal above a 1st order is also referred to as an HOA signal. In a possible configuration, an HOA order may range from a 2nd order to a 10th order. A spatial sound field at a moment corresponding to a sampling point of an HOA signal can be reconstructed by superposing spherical harmonic functions based on a coefficient corresponding to the sampling point.

An HOA coefficient for a virtual loudspeaker may be generated according to the foregoing descriptions. $\theta_s$ and $\varphi_s$ in the formula (8) are set to coordinates, namely, an azimuth ($\theta_s$) and an elevation ($\varphi_s$), of a virtual loudspeaker. An HOA coefficient, also referred to as an ambisonics coefficient, for the loudspeaker may be obtained based on the formula (8).

For a 3rd-order HOA signal, assuming that the amplitude s of the ideal planar wave is 1, a 16-channel HOA coefficient corresponding to the 3rd-order HOA signal may be obtained based on the spherical harmonic function $$Y_{m,n}^{\sigma}(\theta_s, \varphi_s).$$

A calculation formula for the 16-channel HOA coefficient corresponding to the 3rd-order HOA signal is specifically shown in Table 1.

TABLE 1

| l | m | Expression in polar coordinates |
|---|---|---|
| 0 | 0 | $\frac{1}{2\sqrt{\pi}}$ |
| 1 | 0 | $\frac{1}{2}\sqrt{\frac{3}{\pi}}\cos\theta$ |
| 1 | +1 | $\frac{1}{2}\sqrt{\frac{3}{\pi}}\cos\theta\cos\varphi$ |
| 1 | −1 | $\frac{1}{2}\sqrt{\frac{3}{\pi}}\sin\theta\sin\varphi$ |
| 2 | 0 | $\frac{1}{4}\sqrt{\frac{5}{\pi}}(3\cos^2\theta - 1)$ |
| 2 | +1 | $\frac{1}{2}\sqrt{\frac{15}{\pi}}\sin\theta\cos\theta\cos\varphi$ |
| 2 | −1 | $\frac{1}{2}\sqrt{\frac{15}{\pi}}\sin\theta\cos\theta\sin\varphi$ |
| 2 | +2 | $\frac{1}{4}\sqrt{\frac{15}{\pi}}\sin^2\theta\cos 2\varphi$ |
| 2 | −2 | $\frac{1}{4}\sqrt{\frac{15}{\pi}}\sin^2\theta\sin 2\varphi$ |

TABLE 1-continued

| l | m | Expression in polar coordinates |
|---|---|---|
| 3 | 0 | $\frac{1}{4}\sqrt{\frac{7}{\pi}}(5\cos^3\theta-3\cos\theta)$ |
| 3 | +1 | $\frac{1}{4}\sqrt{\frac{21}{2\pi}}(5\cos^2\theta-1)\sin\theta\cos\varphi$ |
| 3 | −1 | $\frac{1}{4}\sqrt{\frac{21}{2\pi}}(5\cos^2\theta-1)\sin\theta\sin\varphi$ |
| 3 | +2 | $\frac{1}{4}\sqrt{\frac{105}{\pi}}\cos\theta\sin^2\theta\cos2\varphi$ |
| 3 | −2 | $\frac{1}{4}\sqrt{\frac{105}{\pi}}\cos\theta\sin^2\theta\sin2\varphi$ |
| 3 | +3 | $\frac{1}{4}\sqrt{\frac{35}{2\pi}}\sin^3\theta\cos3\varphi$ |
| 3 | −3 | $\frac{1}{4}\sqrt{\frac{35}{2\pi}}\sin^3\theta\sin3\varphi$ |

In Table 1, θ indicates an azimuth of a loudspeaker, and φ indicates an elevation of the loudspeaker. l indicates an HOA order, and l=0, 1, . . . , and P. m indicates a direction parameter at each order, and m=−l, . . . , and l. Based on the expression in the polar coordinates in Table 1, the 16-channel coefficient corresponding to the $3^{rd}$-order HOA signal may be obtained based on location coordinates of the loudspeaker.

The following describes examples of a method for determining a target virtual loudspeaker for a current frame and a method for generating an audio channel signal. A target virtual loudspeaker for a current frame may alternatively be determined in another manner, and an audio channel signal may alternatively be generated in another manner. This is not specifically limited in embodiments of this application.

A1: An audio encoding assembly determines a quantity of virtual loudspeakers included in a first target virtual loudspeaker and a quantity of virtual loudspeaker signals included in an audio channel signal.

A quantity M of first target virtual loudspeakers cannot exceed a total quantity of virtual loudspeakers. For example, a virtual loudspeaker set includes 1024 virtual loudspeakers. The quantity K of virtual loudspeaker signals (virtual loudspeaker signals to be transmitted by an encoder) cannot exceed the quantity M of first target virtual loudspeakers.

The quantity M of virtual loudspeakers included in the first target virtual loudspeaker may be related to an encoding rate, or may be related to encoder complexity, or may be specified by a user. For example, when the rate is low, for example, is equal to 128 kbps, M=1; when the rate is moderate, for example, is equal to 384 kbps, M=4; or when the rate is high, for example, is equal to 768 kbps, M=7. When the encoder complexity is low, M=1; when the encoder complexity is moderate, M=2; or when the encoder complexity is high, M=6. For another example, when the encoding rate is 128 kbps and an encoding complexity requirement is low, M=1.

Optionally, the quantity M of first target virtual loudspeakers may alternatively be obtained based on a scene signal class parameter. For example, the scene signal class parameter may be an eigenvalue obtained by performing SVD decomposition on a to-be-encoded HOA signal of a current frame. A quantity d of sound sources in different directions that are included in a sound field may be obtained based on the scene signal class parameter, and the quantity M of first target virtual loudspeakers meets the following condition: 1≤N≤d.

A2: Determine a virtual loudspeaker in the first target virtual loudspeaker based on the to-be-encoded HOA signal and a candidate virtual loudspeaker set.

First, a loudspeaker vote value $P_{jil}$ for a $j^{th}$ frequency of the to-be-encoded HOA signal in an $i^{th}$ round is calculated, and a sequence number $g_{j,i}$ of a matching loudspeaker for the $j^{th}$ frequency in the $i^{th}$ round and a vote value $P_{jig_{j,i}}$ corresponding to the loudspeaker are determined. A representative point may be first determined based on the to-be-encoded HOA signal of the current frame, and then the loudspeaker vote value is calculated based on the representative point of the to-be-encoded HOA signal. Alternatively, the loudspeaker vote value may be directly calculated based on each point of the to-be-encoded HOA signal of the current frame. The representative point may be a representative sampling point in time domain or a representative frequency in frequency domain.

A loudspeaker set in the $i^{th}$ round may be a virtual loudspeaker set including Q virtual loudspeakers, or may be a subset selected from a virtual loudspeaker set according to a preset rule. Loudspeaker sets used in different rounds may be the same or different.

In an example in which L' representative frequencies of a to-be-encoded HOA signal are used and a virtual loudspeaker set is used as a loudspeaker for calculating a vote value in each round, this embodiment provides a method for calculating a loudspeaker vote value: A loudspeaker vote value is obtained by projecting an HOA coefficient for a to-be-encoded signal and an HOA coefficient for a loudspeaker.

Specific steps include:

(1) Calculate projected values of an HOA coefficient for a $j^{th}$ frequency of a to-be-encoded signal and an HOA coefficient for an $l^{th}$ loudspeaker to obtain a vote value $P_{jil}$ for the $l^{th}$ loudspeaker in an $i^{th}$ round, where l=1, 2, . . . , and Q.

An implementation method for obtaining a projected value is provided below:

$P_{jil}=\log(E_{jil})$ or $P_{jil}=E_{jil}$; and $E_{jil}=B_{ji}(\theta, \varphi)\cdot B_l(\theta, \varphi)$, where θ is an azimuth, φ is an elevation, $B_j(\theta, \varphi)$ is the HOA coefficient for the $j^{th}$ frequency of the to-be-encoded signal, $B_l(\theta, \varphi)$ is the HOA coefficient for the $l^{th}$ loudspeaker, l=1, 2, . . . , and Q, and Q is the total quantity of loudspeakers.

(2) Obtain, based on the vote value $P_{jil}$, a matching loudspeaker $g_{j,i}$ corresponding to the $j^{th}$ frequency in the $i^{th}$ round of voting, where l=1, 2, . . . , and Q.

For example, a criterion for selecting the matching loudspeaker $g_{j,i}$ corresponding to the $j^{th}$ frequency in the $i^{th}$ round of voting is: selecting a loudspeaker whose vote value has a largest absolute value among vote values corresponding to Q loudspeakers corresponding to the $j^{th}$ frequency in the $i^{th}$ round of voting as the matching loudspeaker for the $j^{th}$ frequency in the $i^{th}$ round of voting, where a sequence number of the loudspeaker is $g_{j,i}$. When $l=g_{j,i}$, the following is obtained: $\text{abs}(P_{jig_{j,i}})=\max(\text{abs}(P_{jil}))$.

(3) If i is less than a quantity I of rounds of voting, an HOA coefficient for the loudspeaker selected for the $j^{th}$ frequency in the $i^{th}$ round of voting is subtracted from a to-be-encoded HOA signal of the $j^{th}$ frequency, to obtain a to-be-encoded HOA signal for calculating a loudspeaker vote value for the $j^{th}$ frequency in a next round:

$$B_j(\theta, \varphi)=B_j(\theta, \varphi)-w\cdot B_{g_{j,i}}(\theta, \varphi)\cdot E_{jig}, \text{ where}$$

$E_{jig}$ is a vote value for the matching loudspeaker for the $j^{th}$ frequency in the $i^{th}$ round of voting, $B_{g_{j,i}}(\theta, \varphi)$ on the right of the formula for $B_j(\theta, \varphi)$ is an HOA coefficient for a to-be-encoded signal corresponding to the $j^{th}$ frequency in the $i^{th}$ round of voting, $B_j(\theta, \varphi)$ on the left of the formula is an HOA coefficient for a to-be-encoded signal corresponding to the $j^{th}$ frequency in an $(i+1)^{th}$ round of voting, and w is a weight, which may be a preset value meeting a condition of $0\leq w\leq 1$, and an adaptive weight calculation method is also provided:

$w=\text{norm}(B_{g_{j,i}}(\theta, \varphi))$, where norm is a 2-norm operation, and $B_{g_{j,i}}(\theta, \varphi)$ is the HOA coefficient for the matching loudspeaker for the $j^{th}$ frequency in the $i^{th}$ round of voting.

(4) Repeat (1) to (3) until vote values $P_{jig_{j,i}}$ for matching loudspeakers for the $j^{th}$ frequency in all rounds are calculated, where i=1, 2, . . . , and I.

(5) Repeat (1) to (4) until vote values $P_{jig_{j,i}}$ for matching loudspeakers for all frequencies are calculated, where i=1, 2, . . . , and I, and j=1, 2, . . . , and L'.

Then a total vote value $VOTE_g$ for each matching loudspeaker is calculated based on a sequence number $g_{i,j}$ of a matching loudspeaker for each representative frequency in each round and a vote value $P_{jig_{j,i}}$ corresponding to the matching loudspeaker: $VOTE_g=\Sigma P_{jig}$ or $VOTE_g=VOTE_g+P_{jig}$.

In a specific implementation, vote values $P_{jig_{j,i}}$ for all matching loudspeakers with a same sequence number are accumulated to obtain a total vote value corresponding to the matching loudspeaker. An example is as follows:

```
for(j=1,j<=L',j++)
{
  for(i=1,j<=I,i++)
{
  VOTE[g_{j,i}] += P_{jig_{j,i}};
}
}
```

An optimal matching loudspeaker set is determined based on the total vote value for the matching loudspeaker. Specifically, selection may be performed on total vote values $VOTE_g$ for all matching loudspeakers. C matching loudspeakers that win voting are selected as the optimal matching loudspeaker set based on the total vote values $VOTE_g$, and then location coordinates $\{f_{g1}(\theta_{g1}, \varphi_{g1}), f_{g2}(\theta_{g2}, \varphi_{g2}), \ldots, f_{gC}(\theta_{gC}, \varphi_{gC})\}$ of the optimal matching speaker set are obtained.

A3: Calculate an HOA coefficient matrix $A[f_{g1}, f_{g2}, \ldots, f_{gC}]$ for the optimal matching loudspeaker set based on the location coordinates of the optimal matching loudspeaker set.

A4: Calculate a virtual loudspeaker signal H: $H=A^{-1}X$ based on a sum of the HOA coefficient matrix for the optimal matching loudspeaker set, where $A^{-1}$ indicates an inverse matrix of the matrix A, a size of the matrix A is (M×C), C is a quantity of loudspeakers that win voting, M is a quantity of sound channels of an $N^{th}$-order HOA coefficient, $M=(N+1)^2$, and a indicates an HOA coefficient for an optimal matching loudspeaker, for example:

$$A=\begin{bmatrix} a_{11} & \cdots & a_{1C} \\ \vdots & \ddots & \vdots \\ a_{M1} & \cdots & a_{MC} \end{bmatrix},$$

where

X indicates a to-be-encoded signal, a size of the matrix X is (M×L), M is a quantity of sound channels of an $N^{th}$-order HOA coefficient, L is a quantity of frequencies, and x indicates an HOA coefficient for the to-be-encoded signal, for example:

$$X=\begin{bmatrix} x_{11} & \cdots & x_{1L} \\ \vdots & \ddots & \vdots \\ x_{M1} & \cdots & x_{ML} \end{bmatrix}.$$

The following describes an encoding method process provided in embodiments of this application with reference to a specific scenario. For example, an audio encoding assembly includes a spatial encoder and a core encoder.

B1: The spatial encoder performs spatial encoding on a to-be-encoded HOA signal to obtain an audio channel signal of a current frame and attribute information of a first target virtual loudspeaker for an audio channel of the current frame, and transmits the attribute information to the core encoder. The attribute information of the first target virtual loudspeaker includes one or more of coordinates, a sequence number, or an HOA coefficient of the first target virtual loudspeaker.

B2: The core encoder performs core encoding on the audio channel signal to obtain a bitstream.

The core encoding may include but is not limited to transformation, psychoacoustic model processing, down-mixing, bandwidth extension, quantization, entropy encoding, and the like. An audio channel signal in frequency domain or an audio channel signal in time domain may be processed during core encoding. This is not limited herein.

An encoding parameter used in the down-mixing may include one or more of an inter-channel pairing parameter, an inter-channel auditory spatial parameter, or an inter-channel bit allocation parameter. That is, the down-mixing may include inter-channel pairing, channel signal adjustment, inter-channel bit allocation, and the like.

Figure 5:
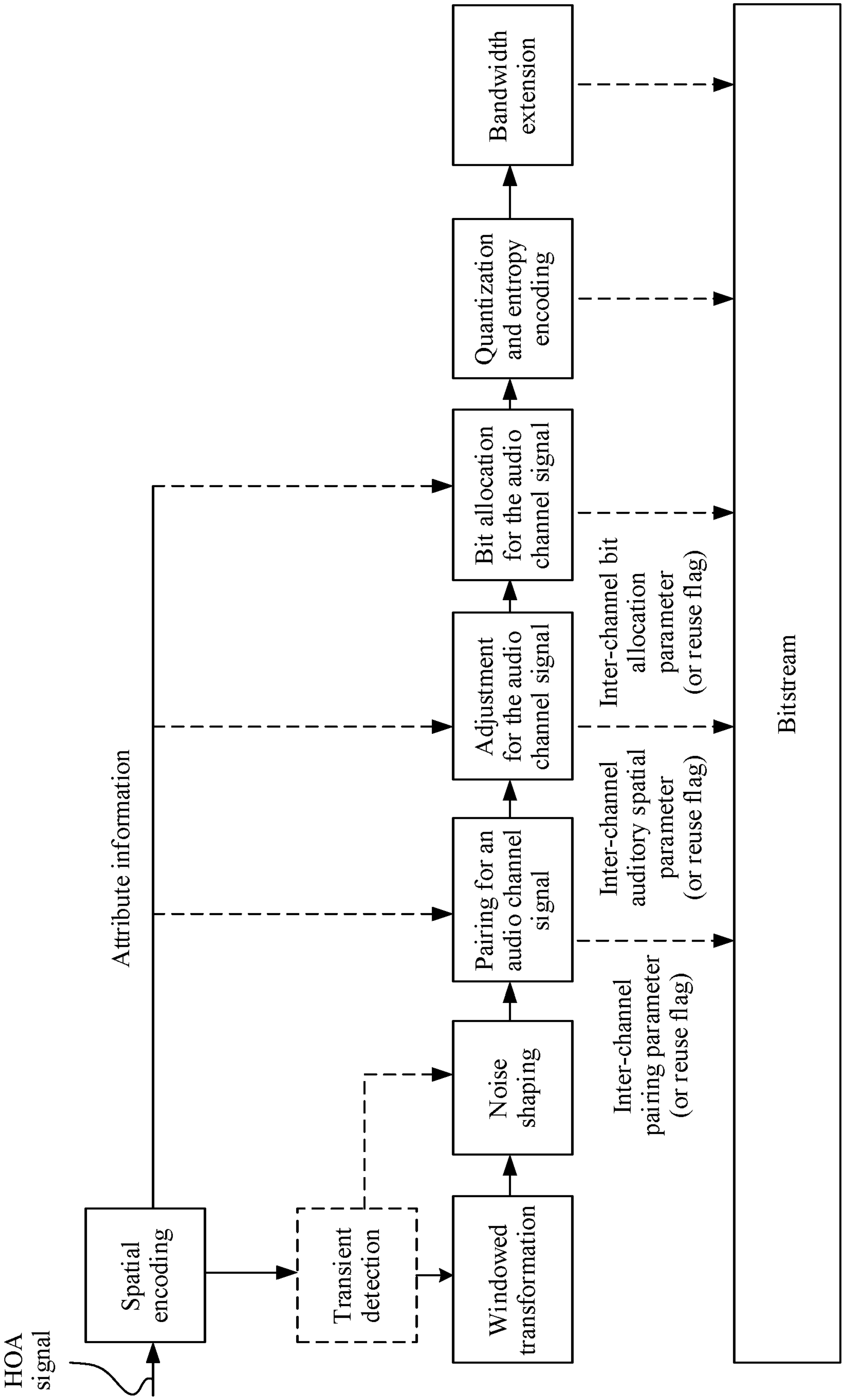
FIG. 5 is a schematic block diagram of an audio encoding process according to an embodiment of this application.

For example, FIG. 5 is a schematic diagram of a possible encoding process.

After the to-be-encoded HOA signal is processed by the spatial encoder, the audio channel signal of the current frame and the attribute information of the first target virtual loudspeaker for the audio channel of the current frame are output. For example, the audio channel signal is a time domain signal. The core encoder performs transient detection on the audio channel signal, and then performs windowed transformation on a signal that has undergone transient detection to obtain a frequency domain signal. Further, noise shaping is performed on the frequency domain signal to obtain a shaped audio channel signal. Then down-mixing is performed on the noise-shaped audio channel signal. The down-mixing may include an inter-channel pairing operation, channel signal adjustment, and an inter-channel signal bit allocation operation. A processing sequence of the inter-channel pairing operation, the channel signal adjustment, and the inter-channel signal bit allocation operation are not specifically limited in this embodiment of this application. As shown in FIG. 5, inter-channel pairing may be first performed. Specifically, inter-channel pairing is performed based on an inter-channel pairing parameter, and the inter-channel pairing parameter and/or a reuse flag are encoded into the bitstream. For the inter-channel pairing parameter, whether an inter-channel pairing parameter of a previous frame is reused as an inter-channel pairing parameter of the current frame may be determined based on the attribute information of the first target virtual loudspeaker (coordinates, a sequence number, or an HOA coefficient of the first target virtual loudspeaker) for the current frame and attribute information of a second target virtual loudspeaker (coordinates, a sequence number, or an HOA coefficient of the second target virtual loudspeaker) for the previous frame. Inter-channel pairing is performed on the noise-shaped audio channel signal of the current frame based on the determined inter-channel pairing parameter of the current frame to obtain a paired audio channel signal. Then channel signal adjustment is performed on the paired audio channel signal. For example, channel signal adjustment may be performed on the paired audio channel signal based on an inter-channel auditory spatial parameter to obtain an adjusted audio channel signal, and the inter-channel auditory spatial parameter and/or a reuse flag are encoded into the bitstream. For the inter-channel auditory spatial parameter, whether an inter-channel auditory spatial parameter of the previous frame is reused as an inter-channel auditory spatial parameter of the current frame may be determined based on the attribute information of the first target virtual loudspeaker (the coordinates, the sequence number, or the HOA coefficient of the first target virtual loudspeaker) for the current frame and the attribute information of the second target virtual loudspeaker (the coordinates, the sequence number, or the HOA coefficient of the second target virtual loudspeaker) for the previous frame. Further, inter-channel bit allocation is performed on the adjusted audio channel signal based on the inter-channel bit allocation parameter, and the inter-channel bit allocation parameter and/or a reuse flag are encoded into the bitstream. For the inter-channel bit allocation parameter, whether an inter-channel bit allocation parameter of the previous frame is reused as an inter-channel bit allocation parameter of the current frame may be determined based on the attribute information of the first target virtual loudspeaker (the coordinates, the sequence number, or the HOA coefficient of the first target virtual loudspeaker) for the current frame and the attribute information of the second target virtual loudspeaker (the coordinates, the sequence number, or the HOA coefficient of the second target virtual loudspeaker) for the previous frame. After inter-channel bit allocation is performed, quantization, entropy encoding, and bandwidth adjustment may be further performed to obtain the bitstream.

Figure 6:
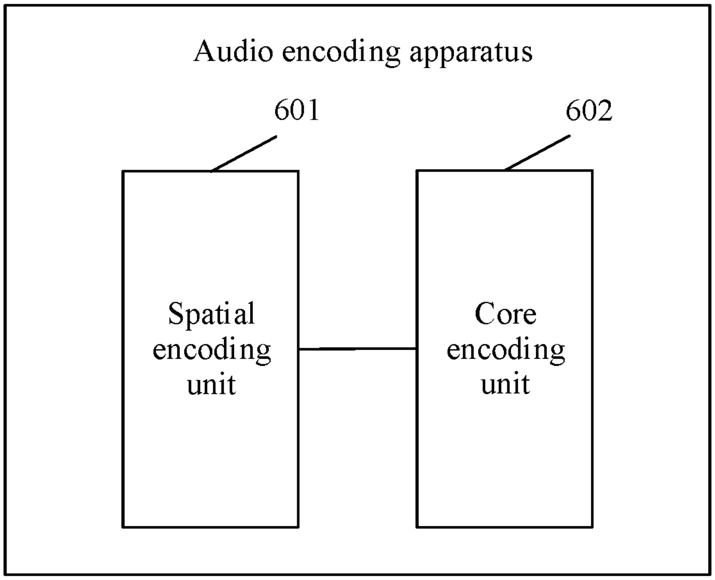
FIG. 6 is a schematic diagram of an audio encoding apparatus according to an embodiment of this application.

Based on an inventive concept same as that of the foregoing method, an embodiment of this application provides an audio encoding apparatus. As shown in FIG. 6, the audio encoding apparatus may include: a spatial encoding unit 601, configured to obtain an audio channel signal of a current frame, where the audio channel signal of the current frame is obtained by performing spatial mapping on a raw higher order ambisonics HOA signal by using a first target virtual loudspeaker; and a core encoding unit 602, configured to: when it is determined that the first target virtual loudspeaker and a second target virtual loudspeaker corresponding to an audio channel signal of a previous frame of the current frame meet a specified condition, determine a first encoding parameter of the audio channel signal of the current frame based on a second encoding parameter of the audio channel signal of the previous frame, encode the audio channel signal of the current frame based on the first encoding parameter, and write an encoded signal into a bitstream.

In a possible design, the core encoding unit 602 is further configured to write the first encoding parameter into the bitstream.

In a possible design, the first encoding parameter includes one or more of an inter-channel pairing parameter, an inter-channel auditory spatial parameter, or an inter-channel bit allocation parameter.

In a possible design, the specified condition includes that a first spatial location overlaps a second spatial location, and the core encoding unit 602 is specifically configured to use the encoding parameter of the audio channel signal of the previous frame as the first encoding parameter of the audio channel signal of the current frame.

In a possible design, the core encoding unit 602 is further configured to write a reuse flag into the bitstream, where a value of the reuse flag is a first value, and the first value indicates that the second encoding parameter is reused as the first encoding parameter of the audio channel signal of the current frame.

In a possible design, the first spatial location includes first coordinates of the first target virtual loudspeaker, the second spatial location includes second coordinates of the second target virtual loudspeaker, and that the first spatial location overlaps the second spatial location includes that the first coordinates are the same as the second coordinates; or the first spatial location includes a first sequence number of the first target virtual loudspeaker, the second spatial location includes a second sequence number of the second target virtual loudspeaker, and that the first spatial location overlaps the second spatial location includes that the first sequence number is the same as the second sequence number; or the first spatial location includes a first HOA coefficient for the first target virtual loudspeaker, the second spatial location includes a second HOA coefficient for the second target virtual loudspeaker, and that the first spatial location overlaps the second spatial location includes that the first HOA coefficient is the same as the second HOA coefficient.

In a possible design, the first target virtual loudspeaker includes M virtual loudspeakers, and the second target virtual loudspeaker includes N virtual loudspeakers; the specified condition includes: the first spatial location does not overlap the second spatial location, and an $m^{th}$ virtual loudspeaker included in the first target virtual loudspeaker is located within a specified range centered on an $n^{th}$ virtual loudspeaker included in the second target virtual loudspeaker, where m includes positive integers less than or equal to M, and n includes positive integers less than or equal to N; and the core encoding unit 602 is specifically configured to adjust the second encoding parameter based on a specified ratio to obtain the first encoding parameter.

In a possible design, when the first spatial location includes the first coordinates of the first target virtual loudspeaker, and the second spatial location includes the second coordinates of the second target virtual loudspeaker, whether the $m^{th}$ virtual loudspeaker is located within the specified range centered on the $n^{th}$ virtual loudspeaker is determined by relevance between the $m^{th}$ virtual loudspeaker and the $n^{th}$ virtual loudspeaker, where the relevance meets the following condition:

$$R = norm(M_H \cdot M_{FH}^T),$$

where

R indicates the relevance, norm( ) indicates a normalization operation, $M_H$ is a matrix formed by coordinates of virtual loudspeakers included in the first target virtual loudspeaker for the current frame, and $$M_{FH}^T$$

is a transpose of a matrix formed by coordinates of virtual loudspeakers included in the second target virtual loudspeaker for the previous frame; and when the relevance is greater than a specified value, the $m^{th}$ virtual loudspeaker is located within the specified range centered on the $n^{th}$ virtual loudspeaker, where m includes positive integers less than or equal to M, and n includes positive integers less than or equal to N.

In a possible design, the core encoding unit 602 is further configured to write a reuse flag into the bitstream, where a value of the reuse flag is a second value, and the second value indicates that the first encoding parameter of the audio channel signal of the current frame is obtained by adjusting the second encoding parameter based on the specified ratio.

In a possible design, the core encoding unit is further configured to write the specified ratio into the bitstream.

Figure 7:
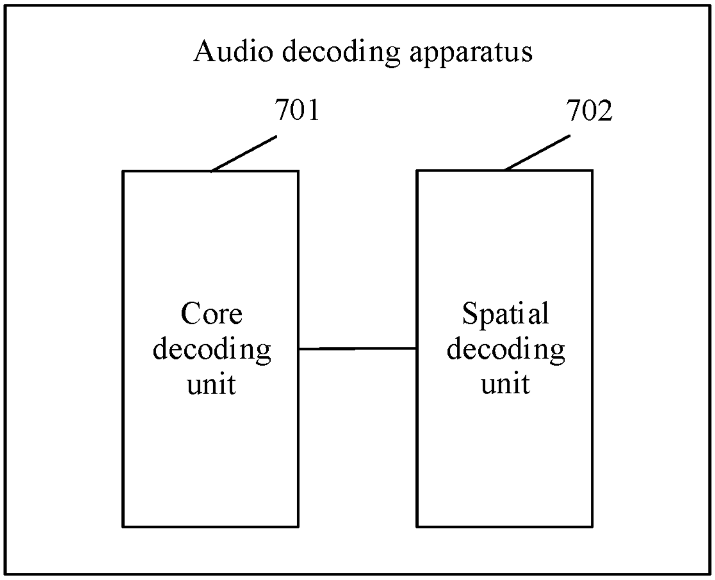
FIG. 7 is a schematic diagram of an audio decoding apparatus according to an embodiment of this application.

Based on an inventive concept same as that of the foregoing method, an embodiment of this application provides an audio decoding apparatus. As shown in FIG. 7, the audio decoding apparatus may include: a core decoding unit 701, configured to: parse a reuse flag from a bitstream, where the reuse flag indicates that a first encoding parameter of an audio channel signal of a current frame is determined based on a second encoding parameter of an audio channel signal of a previous frame of the current frame; determine the first encoding parameter based on the second encoding parameter of the audio channel signal of the previous frame; and decode the audio channel signal of the current frame from the bitstream based on the first encoding parameter; and a spatial decoding unit 702, configured to perform spatial decoding on the audio channel signal to obtain a higher order ambisonics HOA signal.

In a possible design, the core decoding unit 701 is specifically configured to: when a value of the reuse flag is a first value and the first value indicates that the second encoding parameter is reused as the first encoding parameter, obtain the second encoding parameter as the first encoding parameter.

In a possible design, the core decoding unit 701 is specifically configured to: when a value of the reuse flag is a second value and the second value indicates that the first encoding parameter is obtained by adjusting the second encoding parameter based on a specified ratio, adjust the second encoding parameter based on the specified ratio to obtain the first encoding parameter.

In a possible design, the core decoding unit 701 is specifically configured to: when the value of the reuse flag is the second value, decode the bitstream to obtain the specified ratio.

In a possible design, an encoding parameter of the audio channel signal includes one or more of an inter-channel pairing parameter, an inter-channel auditory spatial parameter, or an inter-channel bit allocation parameter.

For example, on a decoder side, in FIG. 7, a location of the core decoding unit 701 corresponds to a location of the core decoder 230 in FIG. 2B. In other words, for specific implementations of functions of the core decoding unit 701, refer to specific details of the core decoder 230 in FIG. 2B. A location of the spatial decoding unit 702 corresponds to a location of the spatial decoder 240 in FIG. 2B. In other words, for specific implementations of functions of the spatial decoding unit 702, refer to specific details of the spatial decoder 240 in FIG. 2B.

For example, on an encoder side, in FIG. 6, a location of the spatial encoding unit 601 corresponds to a location of the spatial encoder 210 in FIG. 2A. In other words, for specific implementations of functions of the spatial encoding unit 601, refer to specific details of the spatial encoder 210 in FIG. 2A. A location of the core encoding unit 602 corresponds to a location of the core encoder 220 in FIG. 2A. In other words, for specific implementations of functions of the core encoding unit 602, refer to specific details of the core encoder 220 in FIG. 2A.

It should be further noted that, for specific implementation processes of the spatial encoding unit 601 and the core encoding unit 602, reference may be made to detailed descriptions of the embodiment in FIG. 3A, FIG. 3B, or FIG. 5. For brevity of this specification, details are not described herein again.

A person skilled in the art can understand that the functions described with reference to various illustrative logical blocks, modules, and algorithm steps disclosed and described in this specification may be implemented by hardware, software, firmware, or any combination thereof. If implemented by software, the functions described with reference to the illustrative logical blocks, modules, and steps may be stored in or transmitted through a computer-readable medium as one or more instructions or code and executed by a hardware-based processing unit. The computer-readable medium may include a computer-readable storage medium, which corresponds to a tangible medium such as a data storage medium, or may include any communication medium that facilitates transmission of a computer program from one place to another place (for example, according to a communication protocol). In this manner, the computer-readable medium may generally correspond to: (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing technologies described in this application. A computer program product may include a computer-readable medium.

As an example rather than a limitation, the computer-readable storage medium may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of instructions or data structures and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but are actually non-transitory tangible storage media. Disks and discs used in this specification include a compact disc (CD), a laser disc, an optical disc, a digital versatile disc (DVD), and a Blu-ray disc. The disks usually reproduce data magnetically, and the discs reproduce data optically through lasers. Combinations of the foregoing items should also be included in the scope of the computer-readable medium.

An instruction may be executed by one or more processors such as one or more digital signal processors (DSP), general-purpose microprocessors, application-specific integrated circuits (ASIC), field programmable gate arrays (FPGA), or other equivalent integrated or discrete logic circuits. Therefore, the term "processor" used in this specification may refer to the foregoing structure or any other structure suitable for implementing technologies described in this specification. In addition, in some aspects, the functions described with reference to the illustrative logical blocks, modules, and steps described in this specification may be provided in dedicated hardware and/or software modules configured for encoding and decoding, or may be integrated into a combined codec. In addition, the technologies may be completely implemented in one or more circuits or logic elements.

Technologies of this application may be implemented in various apparatuses or devices, including a wireless handset, an integrated circuit (IC), or a set of ICs (for example, a chip set). Various components, modules, or units are described in this application to emphasize functional aspects of apparatuses configured to perform disclosed technologies, but do not necessarily need to be implemented by different hardware units. Actually, as described above, various units may be combined into a codec hardware unit in combination with appropriate software and/or firmware, or may be provided by interoperable hardware units (including the one or more processors described above).

In the foregoing embodiments, the descriptions in the embodiments have respective focuses. For a part that is not described in detail in an embodiment, refer to related descriptions in other embodiments.

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An audio encoding method implemented by an encoder, comprising:

obtaining an audio channel signal of a current frame, wherein the audio channel signal of the current frame is obtained by performing spatial mapping on a raw higher order ambisonics (HOA) signal by using a first target virtual loudspeaker;

when the first target virtual loudspeaker and a second target virtual loudspeaker meet a specified condition, determining a first encoding parameter of the audio channel signal of the current frame based on a second encoding parameter of an audio channel signal of a previous frame of the current frame, wherein the audio channel signal of the previous frame corresponds to the second target virtual loudspeaker;

encoding the audio channel signal of the current frame based on the first encoding parameter; and writing an encoding result for the audio channel signal of the current frame into a bitstream.

2. The audio encoding method according to claim 1, further comprising:

writing the first encoding parameter into the bitstream.

3. The audio encoding method according to claim 1, wherein the first encoding parameter comprises one or more of an inter-channel pairing parameter, an inter-channel auditory spatial parameter, or an inter-channel bit allocation parameter.

4. The audio encoding method according to claim 1, wherein the specified condition comprises that a first spatial location of the first target virtual loudspeaker overlaps a second spatial location of the second target virtual loudspeaker, and wherein the determining the first encoding parameter of the audio channel signal of the current frame based on the second encoding parameter of the audio channel signal of the previous frame comprises:

using the second encoding parameter of the audio channel signal of the previous frame as the first encoding parameter of the audio channel signal of the current frame.

5. The audio encoding method according to claim 4, further comprising:

writing a reuse flag into the bitstream, wherein a value of the reuse flag is a first value, and the first value indicates that the second encoding parameter is reused as the first encoding parameter of the audio channel signal of the current frame.

6. The audio encoding method according to claim 4, wherein the first spatial location comprises first coordinates of the first target virtual loudspeaker, the second spatial location comprises second coordinates of the second target virtual loudspeaker, and that the first spatial location overlaps the second spatial location comprises that the first coordinates are the same as the second coordinates; or wherein the first spatial location comprises a first sequence number of the first target virtual loudspeaker, the second spatial location comprises a second sequence number of the second target virtual loudspeaker, and that the first spatial location overlaps the second spatial location comprises that the first sequence number is the same as the second sequence number; or wherein the first spatial location comprises a first HOA coefficient for the first target virtual loudspeaker, the second spatial location comprises a second HOA coefficient for the second target virtual loudspeaker, and that the first spatial location overlaps the second spatial location comprises that the first HOA coefficient is the same as the second HOA coefficient.

7. The audio encoding method according to claim 1, wherein the first target virtual loudspeaker comprises M virtual loudspeakers, and the second target virtual loudspeaker comprises N virtual loudspeakers, wherein the specified condition comprises: the first spatial location of the first target virtual loudspeaker does not overlap the second spatial location of the second target virtual loudspeaker, and an $m^{th}$ virtual loudspeaker comprised in the first target virtual loudspeaker is located within a specified range centered on an $n^{th}$ virtual loudspeaker comprised in the second target virtual loudspeaker, wherein m comprises positive integers less than or equal to M, and n comprises positive integers less than or equal to N, and wherein the determining the first encoding parameter of the audio channel signal of the current frame based on the second encoding parameter of the audio channel signal of the previous frame comprises:

adjusting the second encoding parameter based on a specified ratio to obtain the first encoding parameter.

8. The audio encoding method according to claim 7, wherein when the first spatial location comprises the first coordinates of the first target virtual loudspeaker, and the second spatial location comprises the second coordinates of the second target virtual loudspeaker, whether the $m^{th}$ virtual loudspeaker is located within the specified range centered on the $n^{th}$ virtual loudspeaker is determined by relevance between the $m^{th}$ virtual loudspeaker and the $n^{th}$ virtual loudspeaker, wherein the relevance meets the following condition:

$$R = norm\left(M_H \cdot M_{FH}^T\right),$$

R indicates the relevance, norm( ) indicates a normalization operation, $M_M$ is a matrix formed by coordinates of virtual loudspeakers comprised in the first target virtual loudspeaker for the current frame, and $$M_{FH}^T$$

is a transpose or a matrix formed by coordinates of virtual loudspeakers comprised in the second target virtual loudspeaker for the previous frame, and wherein when the relevance is greater than a specified value, the $m^{th}$ virtual loudspeaker is located within the specified range centered on the $n^{th}$ virtual loudspeaker.

9. The audio encoding method according to claim 7, further comprising:

writing a reuse flag into the bitstream, wherein a value of the reuse flag is a second value, and the second value indicates that the first encoding parameter of the audio channel signal of the current frame is obtained by adjusting the second encoding parameter based on the specified ratio.

10. The audio encoding method according to claim 7, further comprising:

writing the specified ratio into the bitstream.

11. An audio encoding device, comprising:

a nonvolatile memory; and one or more processors coupled to the nonvolatile memory, wherein the one or more processors are configured to execute programming instructions stored in the nonvolatile memory to perform steps of:

obtaining an audio channel signal of a current frame, wherein the audio channel signal of the current frame is obtained by performing spatial mapping on a raw higher order ambisonics (HOA) signal by using a first target virtual loudspeaker;

when the first target virtual loudspeaker and a second target virtual loudspeaker meet a specified condition, determining a first encoding parameter of the audio channel signal of the current frame based on a second encoding parameter of an audio channel signal of a previous frame of the current frame, wherein the audio channel signal of the previous frame corresponds to the second target virtual loudspeaker;

encoding the audio channel signal of the current frame based on the first encoding parameter; and writing an encoding result for the audio channel signal of the current frame into a bitstream.

12. The audio encoding device according to claim 11, wherein the one or more processors are further configured to execute programming instructions stored in the nonvolatile memory to perform a step of:

writing the first encoding parameter into the bitstream.

13. The audio encoding device according to claim 11, wherein the first encoding parameter comprises one or more of an inter-channel pairing parameter, an inter-channel auditory spatial parameter, or an inter-channel bit allocation parameter.

14. The audio encoding device according to claim 11, wherein the specified condition comprises that a first spatial location of the first target virtual loudspeaker overlaps a second spatial location of the second target virtual loudspeaker, and wherein the determining the first encoding parameter of the audio channel signal of the current frame based on the second encoding parameter of the audio channel signal of the previous frame comprises:

using the second encoding parameter of the audio channel signal of the previous frame as the first encoding parameter of the audio channel signal of the current frame.

* * * * *